US008930472B2

(12) United States Patent
Leacock et al.

(10) Patent No.: US 8,930,472 B2
(45) Date of Patent: Jan. 6, 2015

(54) PROMOTING COMMUNICANT INTERACTIONS IN A NETWORK COMMUNICATIONS ENVIRONMENT

(75) Inventors: Matthew Leacock, Sunnyvale, CA (US); David Van Wie, Eugene, OR (US); Paul J. Brody, Palo Alto, CA (US)

(73) Assignee: Social Communications Company, Sunnyvale, CA (US)

( * ) Notice: Subject to any disclaimer, the term of this patent is extended or adjusted under 35 U.S.C. 154(b) by 415 days.

(21) Appl. No.: 13/209,812

(22) Filed: Aug. 15, 2011

(65) Prior Publication Data

US 2011/0302509 A1 Dec. 8, 2011

Related U.S. Application Data

(63) Continuation-in-part of application No. 12/418,243, filed on Apr. 3, 2009, now Pat. No. 8,191,001, and a continuation-in-part of application No. 12/354,709, filed on Jan. 15, 2009, now Pat. No. 8,397,168.

(60) Provisional application No. 61/373,914, filed on Aug. 16, 2010, provisional application No. 61/042,714, filed on Apr. 5, 2008.

(51) Int. Cl.
*G06F 15/16* (2006.01)
*G06Q 10/10* (2012.01)
*H04L 12/58* (2006.01)

(52) U.S. Cl.
CPC ............ *G06Q 10/10* (2013.01); *H04L 12/5835* (2013.01); *H04L 12/5815* (2013.01); *H04L 51/066* (2013.01); *H04L 51/043* (2013.01)
USPC ........................................................ 709/206

(58) Field of Classification Search
CPC . H04L 51/043; H04L 51/066; H04L 12/5835; G06Q 10/10; G06F 3/00
USPC .................. 709/203, 206, 223, 224, 225, 226
See application file for complete search history.

(56) References Cited

U.S. PATENT DOCUMENTS 5,471,318 A 11/1995 Ahuja
5,491,743 A 2/1996 Shiio
(Continued)

FOREIGN PATENT DOCUMENTS

EP 01964597 A1 3/2008
EP 2237537 10/2010
(Continued)

OTHER PUBLICATIONS

International Search Report and Written Opinion received in counterpart International Application No. PCT/US2011/047724, mailed Mar. 6, 2012.
(Continued)

*Primary Examiner* — Vivek Srivastava
*Assistant Examiner* — Normin Abedin
(74) *Attorney, Agent, or Firm* — Edouard Garcia

(57) ABSTRACT

In a network communication environment in which communicants operating from respective client network nodes connect to different server applications, communicants who are related to a target communicant are ascertained, statuses of the related communicants with respect to the different server applications are determined, and indications of the related communicants and the determined statuses of the related communicants are transmitted to the target communicant. Graphical representations of the related communicants and graphical indications of the statuses of the related communicants with respect to connections to the different server applications may be displayed on a display. A contact list including a respective graphical representation of each of one or more of the communicants also may be displayed in association with visual cues representing the ascertained types of current interaction activities respectively engaged in by the one or more communicants. A single universal user identifier may be used to identify each communicant.

49 Claims, 21 Drawing Sheets

(56) References Cited

U.S. PATENT DOCUMENTS

| | | | |
|---|---|---|---|
| 5,627,978 A | 5/1997 | Altom |
| 5,758,110 A | 5/1998 | Boss |
| 5,764,916 A | 6/1998 | Busey |
| 5,793,365 A | 8/1998 | Tang |
| 5,938,724 A | 8/1999 | Pommier |
| 5,949,414 A | 9/1999 | Namikata |
| 5,982,372 A | 11/1999 | Brush, II |
| 5,995,096 A | 11/1999 | Kitahara |
| 5,999,208 A | 12/1999 | McNerney |
| 6,047,314 A | 4/2000 | Pommier |
| 6,057,856 A | 5/2000 | Miyashita |
| 6,119,147 A | 9/2000 | Toomey |
| 6,119,166 A | 9/2000 | Bergman |
| 6,219,045 B1 | 4/2001 | Leahy |
| 6,237,025 B1 | 5/2001 | Ludwig |
| 6,275,490 B1 | 8/2001 | Mattaway |
| 6,304,283 B1 | 10/2001 | Kitagawa |
| 6,380,952 B1 | 4/2002 | Mass |
| 6,392,760 B1 | 5/2002 | Ahuja |
| 6,400,381 B1 | 6/2002 | Barrett |
| 6,572,476 B2 | 6/2003 | Shoji |
| 6,580,441 B2 | 6/2003 | Schileru-Key |
| 6,671,818 B1 | 12/2003 | Mikurak |
| 6,708,172 B1 | 3/2004 | Wong |
| 6,714,222 B1 | 3/2004 | Bjorn |
| 6,731,314 B1 | 5/2004 | Cheng |
| 6,785,708 B1 | 8/2004 | Busey |
| 6,862,625 B1 | 3/2005 | Busey |
| 6,909,443 B1 | 6/2005 | Robertson |
| 7,016,978 B2 | 3/2006 | Malik |
| 7,036,082 B1 | 4/2006 | Dalrymple |
| 7,058,896 B2 | 6/2006 | Hughes |
| 7,086,005 B1 | 8/2006 | Matsuda |
| 7,133,900 B1 | 11/2006 | Szeto |
| 7,165,213 B1 | 1/2007 | Busey |
| 7,168,048 B1 | 1/2007 | Goossen |
| 7,168,051 B2 | 1/2007 | Robinson |
| 7,181,690 B1 | 2/2007 | Leahy |
| 7,184,037 B2 | 2/2007 | Gallery |
| 7,188,317 B1 | 3/2007 | Hazel |
| 7,194,542 B2 | 3/2007 | Segan |
| 7,240,826 B2 | 7/2007 | Abecassis |
| 7,263,526 B1 | 8/2007 | Busey |
| 7,293,243 B1 | 11/2007 | Ben-Shachar |
| 7,336,779 B2 | 2/2008 | Boyer |
| 7,342,587 B2 | 3/2008 | Danzig |
| 7,346,654 B1 | 3/2008 | Weiss |
| 7,356,563 B1 | 4/2008 | Leichtling |
| 7,392,306 B1 | 6/2008 | Donner |
| 7,418,664 B2 | 8/2008 | Ben-Shachar |
| 7,426,540 B1 | 9/2008 | Matsumoto |
| 7,451,181 B2 | 11/2008 | Sasaki |
| 7,474,741 B2 | 1/2009 | Brunson |
| 7,478,086 B2 | 1/2009 | Samn |
| 7,499,926 B1 | 3/2009 | Burckart |
| 7,503,006 B2 | 3/2009 | Danieli |
| 7,516,411 B2 | 4/2009 | Grossner |
| 7,530,028 B2 | 5/2009 | Mulcahy |
| 7,594,179 B2 | 9/2009 | Takemura |
| 7,616,624 B2 | 11/2009 | John |
| 7,630,986 B1 | 12/2009 | Herz |
| 7,676,542 B2 | 3/2010 | Moser |
| 7,680,098 B2 | 3/2010 | John |
| 7,680,480 B2 | 3/2010 | John |
| 7,707,249 B2 | 4/2010 | Spataro |
| 7,730,063 B2 | 6/2010 | Eder |
| 7,734,691 B2 | 6/2010 | Creamer |
| 7,734,692 B2 | 6/2010 | Kaplan |
| 7,747,719 B1 | 6/2010 | Horovitz |
| 7,765,259 B2 | 7/2010 | MacVarish |
| 7,769,606 B2 | 8/2010 | Boone |
| 7,805,406 B2 | 9/2010 | Craig |
| 7,813,488 B2 | 10/2010 | Kozdon |
| 7,827,288 B2 | 11/2010 | Da Palma |
| 7,840,668 B1 | 11/2010 | Sylvain |
| 7,895,208 B2 | 2/2011 | Konopnicki |
| 7,958,453 B1 | 6/2011 | Taing |
| 2002/0049814 A1 | 4/2002 | Yoo |
| 2002/0080195 A1 | 6/2002 | Carlson |
| 2002/0085035 A1 | 7/2002 | Orbanes |
| 2002/0097267 A1 | 7/2002 | Dinan |
| 2002/0109680 A1 | 8/2002 | Orbanes |
| 2002/0165922 A1 | 11/2002 | Wei |
| 2003/0037112 A1 | 2/2003 | Fitzpatrick |
| 2003/0043200 A1 | 3/2003 | Faieta |
| 2003/0046374 A1 | 3/2003 | Hilt |
| 2003/0077561 A1 | 4/2003 | Alsop |
| 2003/0191799 A1 | 10/2003 | Araujo |
| 2003/0197739 A1 | 10/2003 | Bauer |
| 2003/0212746 A1 | 11/2003 | Fitzpatrick |
| 2003/0222902 A1 | 12/2003 | Chupin |
| 2004/0030741 A1 | 2/2004 | Wolton |
| 2004/0030783 A1 | 2/2004 | Hwang |
| 2004/0078444 A1 | 4/2004 | Malik |
| 2004/0128350 A1 | 7/2004 | Topfl |
| 2004/0158610 A1 | 8/2004 | Davis |
| 2004/0179038 A1 | 9/2004 | Blattner |
| 2004/0210847 A1 | 10/2004 | Berson |
| 2005/0021624 A1 | 1/2005 | Herf |
| 2005/0071426 A1 | 3/2005 | Shaw |
| 2005/0080866 A1 | 4/2005 | Kent, Jr. |
| 2005/0108033 A1 | 5/2005 | Everett-Church |
| 2005/0132299 A1 | 6/2005 | Jones |
| 2005/0138570 A1 | 6/2005 | Good |
| 2005/0154574 A1 | 7/2005 | Takemura |
| 2005/0163311 A1 | 7/2005 | Fowler |
| 2005/0210008 A1 | 9/2005 | Tran |
| 2005/0215252 A1 | 9/2005 | Jung |
| 2005/0232168 A1 | 10/2005 | Schauser |
| 2005/0235034 A1 | 10/2005 | Chen |
| 2006/0005187 A1 | 1/2006 | Neil |
| 2006/0031779 A1 | 2/2006 | Theurer |
| 2006/0041684 A1* | 2/2006 | Daniell et al. ............... 709/246 |
| 2006/0117264 A1 | 6/2006 | Beaton |
| 2006/0136837 A1 | 6/2006 | Ben-Shachar |
| 2006/0161624 A1 | 7/2006 | Montgomery |
| 2006/0167972 A1 | 7/2006 | Zombek |
| 2006/0167996 A1 | 7/2006 | Orsolini |
| 2006/0184886 A1 | 8/2006 | Chung |
| 2006/0200435 A1 | 9/2006 | Flinn |
| 2006/0212147 A1 | 9/2006 | McGrath |
| 2006/0248159 A1 | 11/2006 | Polan |
| 2007/0011232 A1* | 1/2007 | Manion et al. ............... 709/204 |
| 2007/0047700 A1 | 3/2007 | Mohler |
| 2007/0061399 A1 | 3/2007 | Schmieder |
| 2007/0101282 A1 | 5/2007 | Goossen |
| 2007/0135099 A1 | 6/2007 | Taylor |
| 2007/0136686 A1 | 6/2007 | Price |
| 2007/0156908 A1 | 7/2007 | Szomolanyi |
| 2007/0198645 A1 | 8/2007 | Chen |
| 2007/0214424 A1 | 9/2007 | Gilead |
| 2007/0220111 A1 | 9/2007 | Lin |
| 2007/0233785 A1 | 10/2007 | Abraham |
| 2007/0234212 A1 | 10/2007 | de Souza |
| 2007/0274291 A1 | 11/2007 | Diomelli |
| 2007/0279484 A1 | 12/2007 | Derocher |
| 2007/0286366 A1 | 12/2007 | Deboy |
| 2007/0291034 A1 | 12/2007 | Dones |
| 2008/0019285 A1 | 1/2008 | John |
| 2008/0021949 A1 | 1/2008 | John |
| 2008/0052373 A1 | 2/2008 | Pousti |
| 2008/0059570 A1 | 3/2008 | Bill |
| 2008/0101561 A1* | 5/2008 | Choi et al. ............... 379/88.17 |
| 2008/0163090 A1 | 7/2008 | Cortright |
| 2008/0163379 A1 | 7/2008 | Robinson |
| 2008/0168154 A1 | 7/2008 | Skyrm |
| 2008/0214204 A1 | 9/2008 | Ramer |
| 2008/0214253 A1 | 9/2008 | Gillo |
| 2008/0215679 A1 | 9/2008 | Gillo |
| 2008/0215971 A1 | 9/2008 | Gillo |
| 2008/0215972 A1 | 9/2008 | Zalewski |
| 2008/0215973 A1 | 9/2008 | Zalewski |
| 2008/0215974 A1 | 9/2008 | Harrison |
| 2008/0215975 A1 | 9/2008 | Harrison |

(56) References Cited

U.S. PATENT DOCUMENTS

| | | |
|---|---|---|
| 2008/0215994 A1 | 9/2008 | Harrison |
| 2008/0235582 A1 | 9/2008 | Zalewski |
| 2008/0244458 A1 | 10/2008 | Brugiolo |
| 2009/0063677 A1 | 3/2009 | Forlenza et al. |
| 2009/0096810 A1 | 4/2009 | Green |
| 2009/0100355 A1 | 4/2009 | Takemura |
| 2009/0106376 A1 | 4/2009 | Tom |
| 2009/0177659 A1 | 7/2009 | Kim |
| 2009/0199095 A1 | 8/2009 | Nicol, II |
| 2009/0199275 A1 | 8/2009 | Brock |
| 2009/0222742 A1 | 9/2009 | Pelton |
| 2009/0241037 A1 | 9/2009 | Hyndman |
| 2009/0247196 A1 | 10/2009 | Kim |
| 2009/0251457 A1 | 10/2009 | Walker |
| 2009/0254840 A1 | 10/2009 | Churchill |
| 2009/0288007 A1 | 11/2009 | Leacock |
| 2009/0300521 A1* | 12/2009 | Jerrard-Dunne et al. ..... 715/757 |
| 2009/0307189 A1 | 12/2009 | Bobbitt |
| 2010/0058229 A1 | 3/2010 | Mercer |
| 2010/0138492 A1 | 6/2010 | Guzman |
| 2010/0162121 A1 | 6/2010 | Yoakum |
| 2010/0164956 A1 | 7/2010 | Hyndman |
| 2010/0169796 A1 | 7/2010 | Lynk |
| 2010/0169799 A1 | 7/2010 | Hyndman |
| 2010/0169837 A1 | 7/2010 | Hyndman |
| 2010/0169888 A1 | 7/2010 | Hare |
| 2010/0185733 A1 | 7/2010 | Hon |
| 2010/0198653 A1 | 8/2010 | Bromenshenkel |
| 2010/0216553 A1 | 8/2010 | Chudley |
| 2010/0228560 A1 | 9/2010 | Balasaygun |
| 2010/0235501 A1 | 9/2010 | Klemm |
| 2010/0241432 A1 | 9/2010 | Michaelis |
| 2010/0246570 A1 | 9/2010 | Chavez |
| 2010/0246571 A1 | 9/2010 | Geppert |
| 2010/0246800 A1 | 9/2010 | Geppert |
| 2010/0251119 A1 | 9/2010 | Geppert |
| 2010/0251124 A1 | 9/2010 | Geppert |
| 2010/0251127 A1 | 9/2010 | Geppert |
| 2010/0251142 A1 | 9/2010 | Geppert |
| 2010/0251158 A1 | 9/2010 | Geppert |
| 2010/0251177 A1 | 9/2010 | Geppert |
| 2010/0262550 A1 | 10/2010 | Burritt |
| 2010/0322395 A1 | 12/2010 | Michaelis |
| 2010/0332998 A1 | 12/2010 | Sun |
| 2011/0296319 A1 | 12/2011 | Dinan |
| 2012/0050257 A1 | 3/2012 | Clarke |
| 2012/0268468 A1 | 10/2012 | Elenzil |

FOREIGN PATENT DOCUMENTS

| | | |
|---|---|---|
| EP | 2239930 | 10/2010 |
| KR | 10-1999-0078775 A | 11/1999 |
| KR | 10-2000-0030491 A | 6/2000 |
| KR | 10-2001-0100589 A | 11/2001 |
| KR | 10-2003-0054874 A | 7/2003 |
| KR | 10-2004-0011825 A | 2/2004 |
| KR | 10-2007-0105088 A | 10/2007 |
| WO | 01/84334 A1 | 11/2001 |
| WO | 01/91867 | 12/2001 |
| WO | WO01/91868 | 12/2001 |

OTHER PUBLICATIONS

PCT Search Report and Written Opinion in counterpart application PCT|US2009/039470.

* cited by examiner

| Section Definition Database | | | |
|---|---|---|---|
| Record ID | Data File ID | Section | Data File Component |
| 1 | ID1 | S1 | B(1) |
| 2 | ID1 | S2 | C |
| 3 | ID1 | S3 | B(3), C |

| Section Definition Database | | | |
|---|---|---|---|
| Record ID | Application ID | Section | Application Component |
| 1 | ID2 | S4 | E |
| 2 | ID2 | S5 | F |
| 3 | ID2 | S6 | F(1) |
| 4 | ID2 | S7 | F(2) |
| 5 | ID2 | S8 | F(ii), F(iii) |
| 6 | ID2 | S9 | E(3), F(i) | ns in a diagrammatic manner. The drawings are not
PROMOTING COMMUNICANT INTERACTIONS IN A NETWORK COMMUNICATIONS ENVIRONMENT

CROSS-REFERENCE TO RELATED APPLICATIONS

Under 35 U.S.C. §119(e), this application claims the benefit of U.S. Provisional Application No. 61/373,914, filed Aug. 16, 2010, the entirety of which is incorporated herein by reference.

This application is a continuation-in-part of prior U.S. patent application Ser. No. 12/354,709, filed Jan. 15, 2009, which claims the benefit of U.S. Provisional Application No. 61/042,714, filed Apr. 5, 2008. This application also is a continuation-in-part of prior U.S. patent application Ser. No. 12/418,243, filed Apr. 3, 2009, which claims the benefit of U.S. Provisional Application No. 61/042,714, filed Apr. 5, 2008. The entirety of each of prior U.S. patent application Ser. No. 12/354,709, filed Jan. 15, 2009, and prior U.S. patent application Ser. No. 12/418,243, filed Apr. 3, 2009, is incorporated herein by reference.

This application also relates to the following co-pending patent applications, the entirety of each of which is incorporated herein by reference: U.S. patent application Ser. No. 11/923,629, filed Oct. 24, 2007; U.S. patent application Ser. No. 11/923,634, filed Oct. 24, 2007; U.S. patent application Ser. No. 12/630,973, filed Dec. 4, 2009; U.S. patent application Ser. No. 12/631,008, filed Dec. 4, 2009; U.S. patent application Ser. No. 12/631,026, filed Dec. 4, 2009; and U.S. patent application Ser. No. 12/694,126, filed Jan. 26, 2010.

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in three-dimensional virtual spaces. What are needed are improved interfaces for realtime network communications.

DETAILED DESCRIPTION

Figure 1:
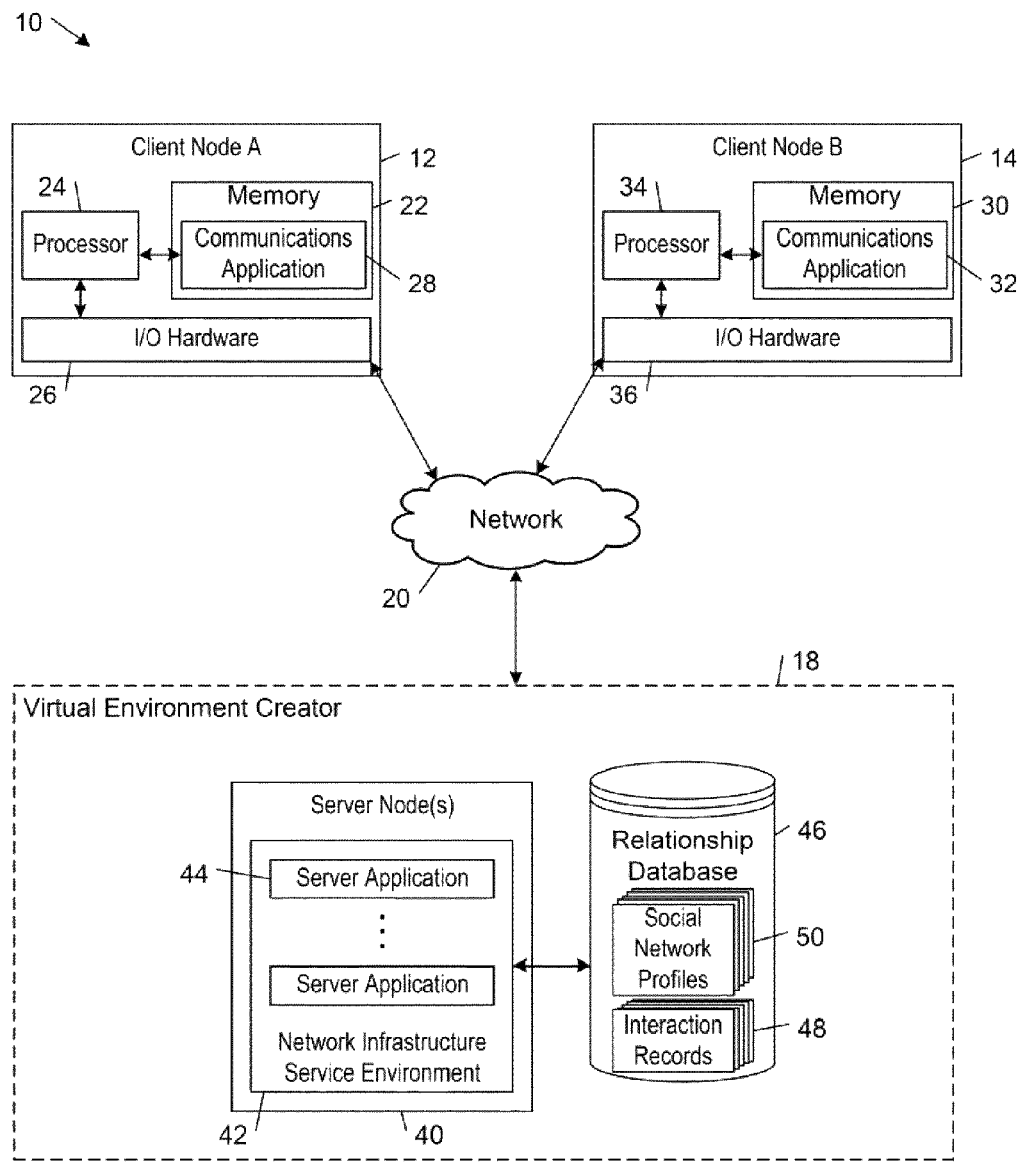
FIG. 1 is a diagrammatic view of an exemplary embodiment of a network communications environment that includes a first client network node, a second client network node, and a server node.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "contact" of a user is a communicant or other person that is connected to the user by either an explicit social network tie that is declared by at least one of the user and the contact (and optionally confirmed by the other) or by a social network tie that is inferred from interactions between the user and the person.

A "communicant interaction" is any type of direct or indirect action or influence between a communicant and another network entity, which may include for example another communicant, a virtual area, or a network service. Exemplary types of communicant interactions include communicants communicating with each other in realtime, a communicant entering a virtual area, and a communicant requesting access to a resource from a network service.

A "social network" is a social structure or map of nodes that are connected by one or more types of interdependency. The "nodes" represent individual entities (e.g., individual communicants, groups of communicants, or organizations) in the network. A social network "tie" represents a relationship between a pair of entities in a social network. The nodes may be interconnected by a variety of different types of ties. A social network "profile" is a set of data that are associated with a single user. These data may include attributes that identify the user (e.g., user name, age, gender, geographic location), attributes that identify the user's friends and acquaintances, attributes that identify the user's interests (e.g., favorite music, books, movies, sports, foods), and attributes that specify the user's preferences (e.g., restrictions on how the system controls access to resources that are associated with the user).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "computer data file" is a block of information that stores data for use by a software application.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Exemplary network nodes include, but are not limited to, a terminal, a computer, and a network switch. A "server" network node is a host computer on a network that responds to requests for information or service. A "client" network node is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link. A "connection handle" is a pointer or identifier (e.g., a uniform resource identifier (URI)) that can be used to establish a network connection with a communicant, resource, or service on a network node. A "network communication" can include any type of information (e.g., text, voice, audio, video, electronic mail message, data file, motion data stream, and data packet) that is transmitted or otherwise conveyed from one network node to another network node over a network connection.

A "resource" refers to any type of information (e.g., a web page, a file, streaming data, and presence data) or service (e.g., a service that establishes a communications link with another user) that is accessible over a network. A resource may be identified by a uniform resource identifier (URI).

Synchronous conferencing refers to communications in which communicants participate at the same time. Synchronous conferencing encompasses all types of networked collaboration technologies, including instant messaging (e.g., text chat), audio conferencing, video conferencing, application sharing, and file sharing technologies.

A "communicant interaction" is any type of direct or indirect action or influence between a communicant and another network entity, which may include for example another communicant, a virtual area, or a network service. Exemplary types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "link" is a connection between two network nodes and represents the full bandwidth allocated by the two nodes for real-time communication. Each link is divided into channels that carry respective real-time data streams. Channels are allocated to particular streams within the overall bandwidth that has been allocated to the link.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "spatial state" is an attribute that describes where a user has presence in a virtual area. The spatial state attribute typically has a respective value (e.g., a zone_ID value) for each of the zones in which the user has presence.

A "communication state" is an attribute that describes a state of a respective communication channel over which a respective one of the communicants is configured to communicate.

In the context of a virtual area, an "object" (also sometimes referred to as a "prop") is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

The term "statistical analysis" refers to a process of analyzing data for the purpose of making generalizations or inferences, determining values of variables of a predictive model, determining one or more metrics that summarize the data, or classifying one or more aspects or subjects of the data.

As used herein, the term "includes" means includes but not limited to, the term "including" means including but not limited to. The term "based on" means based at least in part on.

II. PROMOTING COMMUNICANT INTERACTIONS IN A NETWORK COMMUNICATIONS ENVIRONMENT

A. Introduction

The embodiments that are described herein provide improved systems and methods for promoting communicant interactions in a network communications environment. In particular, these embodiments provide a realtime visualization of a communicant's contacts' realtime availabilities and activities across different communication contexts. This visualization typically includes visual cues that indicate the realtime activities being performed by the communicant's contacts. The information provided by the realtime visualization enables the communicant to make more informed network interaction decisions (e.g., when to interact with a contact) and encourages the communicant to initiate interactions with other communicants and to join contexts (e.g., an ongoing conversation between communicants) of which the communicant otherwise would not have been aware. Some embodiments show a communicant's contacts as iconographical avatars that are sorted into groups according to their respective statuses with respect to the different server applications. For example, a communicant's contacts may be grouped according to their respective membership status and/or presence status with respect to the different server applications. Some embodiments additionally apply a spatial metaphor on top of realtime networked communications. The spatial metaphor provides additional visual cues of the contexts of the current communication states of the communicants involved in realtime networked communications. The spatial metaphor also provides a context for organizing the presentation of various interface elements that are used by communicants to participate in realtime networked communications.

FIG. 1 shows an embodiment of an exemplary network communications environment 10 that includes a first client network node 12 (Client Node A), a second client network node 14 (Client Network Node B), and a virtual environment creator 18 that are interconnected by a network 20. The network 20 may include any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, and video) between network nodes.

The first client network node 12 includes a tangible computer-readable memory 22, a processor 24, and input/output (I/O) hardware 26 (including a display). The processor 24 executes at least one communications application 28 that is stored in the memory 22. The second client network node 14 typically is configured in substantially the same general way as the first client network node 12, with a tangible computer-readable memory 30 storing at least one communications application 32, a processor 34, and input/output (I/O) hardware 36 (including a display).

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

Each source has an active state in which the source is available for originating data and an inactive state in which the source is not available for originating data. Likewise, each sink has an active state in which the sink is available for receiving data and an inactive state in which the sink is not available for receiving data. The states of the sources and sinks typically can be controlled by the communicants operating the client nodes 12, 14 via controls provided by the communications applications 28, 32. For example, in some embodiments, the communications applications 28, 32 provide user controls for turning on/off the local microphones and the local speakers (e.g., headsets) on the client network nodes 12, 14.

The virtual environment creator 18 includes at least one server network node 40 that provides a network infrastructure service environment 42 and hosts different server applications 44. Communicants respectively operating from the client nodes 12, 14 connect to the server applications 44 through the communications applications 28, 32. One or more of the server applications 44 typically are synchronous conferencing server applications that support one or more types of communications between the client nodes 12, 14 (e.g., instant messaging—e.g., text chat, audio conferencing, video conferencing, application sharing, and file sharing). The network infrastructure service environment 42 typically maintains a relationship database 46 that contains records 48 of interactions between communicants and social network profiles 50 that are associated with respective communicants. Each interaction record 48 describes the context of an interaction between a pair of communicants. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

The communications applications 28, 32 respectively operating on the client nodes 12, 14 typically include software and hardware resources which, together with administrative policies, user preferences (including preferences regarding the exportation of the user's presence and the connection of the user to server application and other users), and other settings, define a local configuration that influences the administration of realtime connections with other network nodes.

The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. patent application Ser. No. 11/923,629, filed Oct. 24, 2007, U.S. patent application Ser. No. 11/923,634, filed Oct. 24, 2007, and U.S. patent application Ser. No. 12/630,973, filed Dec. 4, 2009.

In some embodiments, the server network node(s) 40 remotely manage client communication sessions and remotely configure audio and graphic rendering engines on the client network nodes 12, 14, as well as switching of data streams by sending instructions (also referred to as definitions) from the remotely hosted server applications 44 to the client network nodes in accordance with the stream transport protocol described in U.S. patent application Ser. No. 12/825,512, filed Jun. 29, 2010. In some of these embodiments, the server node(s) 40 send to each of the client nodes 12, 14 provisioning messages that configure the client nodes 12, 14 to interconnect respective data streams between active ones of their complementary sources and sinks in accordance with switching rules specified in the server applications 44.

The communications applications 28, 32, the server applications 44, and the network infrastructure service environment 42 together provide a platform (referred to herein as "the platform") for managing communications between communicants operating on the network nodes 12, 14. The platform tracks communicants' realtime availabilities and activities across the different communication contexts that are defined by the server applications 44. This information is presented to the communicants in the form of a realtime visualization that enables the communicants to make more informed network interaction decisions (e.g., when to interact with a contact) and encourages the communicants to initiate interactions with other communicants and to join contexts (e.g., an ongoing conversation between communicants) of which the communicants otherwise would not have been aware. In some embodiments, the realtime visualization includes visual cues as to the presence and activities of the communicants in the contexts of the server applications. The presentation of these visual cues typically depends on one or more of governance rules set by the server applications, administrative policies, and user preferences (including preferences regarding the exportation of the user's presence and the connection of the user to areas and other users). In addition, the level of detail and interactivity of the user may depend on whether or not the user is a member of and/or has a presence in a particular server application or in a particular zone of a server application.

B. Realtime Visualizations of Contact Availabilities and Activities

Figure 2:
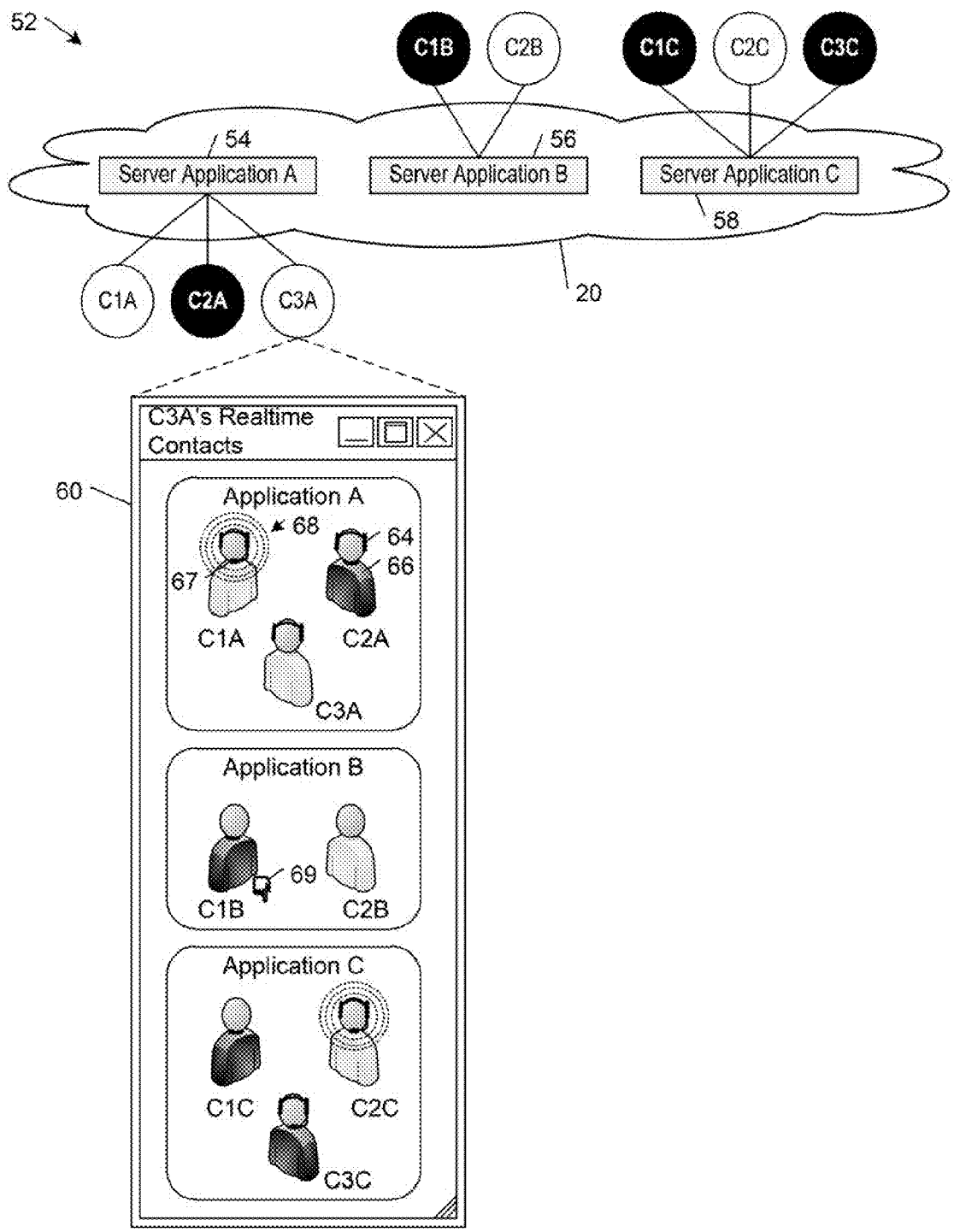
FIG. 2 is a diagrammatic view of a graphical user interface that shows the contacts of a communicant in their respective communication contexts as defined by server applications to which the contacts respectively are connected.

FIG. 2 shows an exemplary embodiment 52 of the network communication environment 10 in which the virtual environment creator includes three server applications 54, 56, 58 to which are connected respective sets of communicants C1A, C2A, C3A, C1B, C2B, C1C, C2C, and C3C. In this example, the communicants C2A, C1B, C1C, and C3C (represented by the colored circles) are contacts of communicant C3A. The platform creates for C3A a visualization of his contacts' realtime availabilities and activities across different communication contexts that are defined by the server applications 54-58. In particular, the platform creates a graphical user interface 60 that shows the contacts of C3A in their respective communication contexts, where the communicants are represented by respective graphical representations (i.e., avatars). Thus, the contact C2A is shown in the context of Application A along with the communicants C1A and C3A, which also are connected to the Application A; the contact C1B is shown in the context of Application B along with the communicant C2B, which also is connected to the Application B; and the contacts C1C and C3C are shown in the context of Application C along with the communicant C2C, which also is connected to the Application C. In this way, the communicant C3A can ascertain which of his contacts are available for communications and other interactions and ascertain the current context of his contacts' availability, including the server applications to which his contacts are connected and whether or not his contacts currently are interacting with other communicants and the identities of those communicants.

The graphical user interface 60 also shows the states of various communication channels over which the communicants are configured to communicate. For example, the "on" or "off" state of a communicant's local speaker channel is depicted by the presence or absence of a headphones graphic 64 on the communicant's graphic representation 66. When the speakers of a communicant are on, the headphones graphic 64 is present and, when the communicant's speakers are off, the headphones graphic 64 is absent. The "on" or "off" state of the communicant's microphone is depicted by the presence or absence of a microphone graphic 67 on the communicant's graphic representation and a series of concentric circles 68 that dynamically radiate away from the communicant's graphic representation in a series of expanding waves. When the microphone is on, the microphone graphic 67 and the radiating concentric circles 68 are present and, when the microphone is off, the microphone graphic 67 and the radiating concentric circles 68 are absent. The headphones graphic 64, the microphone graphic 67, and the radiating concentric circles 68 serve as visual cues of the states of the communicant's sound playback and microphone devices. The "on" or "off" state of a communicant's text chat channel is depicted by the presence or absence of a hand graphic 69 adjacent the communicant's graphic representation. When a communicant is transmitting text chat data to another network node the hand graphic 69 is present, and when a communicant is not transmitting text chat data the hand graphic 69 is not present. In some embodiments, text chat data is transmitted only when keyboard keys are depressed, in which case the visualization of the communicant's text channel appears as a flashing on and off of the hand graphic 69. From the visual cues shown in the People Pane 62, a communicant can infer whether or not a communicant available for communications and can infer whether or not a communicant currently is communicating with another communicant.

Figures 3, 4:
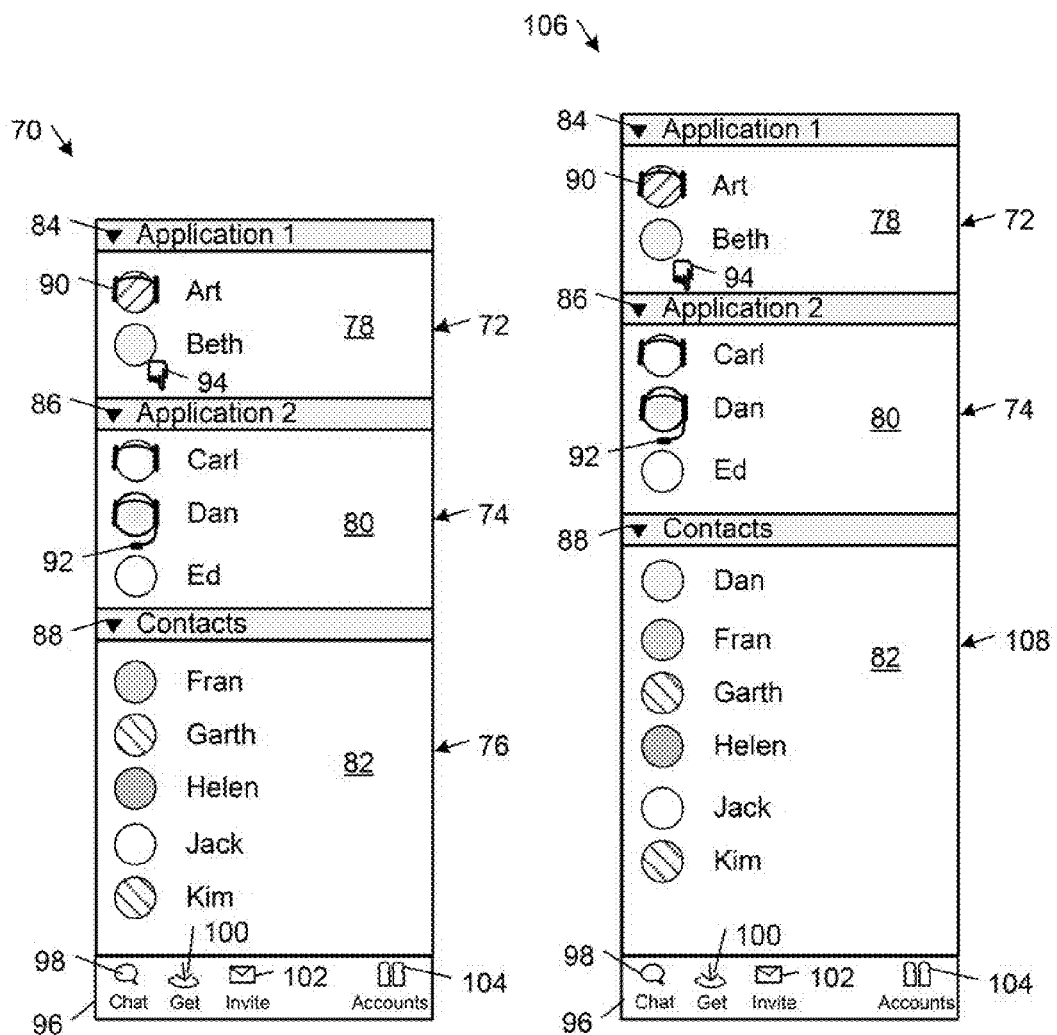
FIG. 3 is a diagrammatic view of an exemplary embodiment of a graphical user interface.
FIG. 4 is a diagrammatic view of an exemplary embodiment of a graphical user interface.

FIG. 3 shows another embodiment 70 of a graphical user interface that depicts the realtime availabilities and activities of some or all of the contacts of a target communicant ("Art" in this example) across different communication contexts. The graphical user interface 70 is generated on a display of the client network node from which Art is operating. The graphical user interface 70 shows Art's communicants segmented into two server application groups 72, 74 and a contacts group 76. The server application groups 72, 74 correspond to each of the server applications of which Art is a member and with respect to which at least one of Art and Art's contacts is present. The contacts group 76 contains all or a selected portion of Art's contacts that are not represented in any of the server application groups. The first server application group 72 of communicants is contained within a section 78 labeled with a header bar entitled "Application 1" that identifies all the communicants who have a presence in the server application "Application 1". The second server application group 74 of communications is contained within a section 80 labeled with a header bar entitled "Application 2" that identifies all the communicants who have a presence in the server application "Application 2". The contacts group 76 of communications is contained within a section 82 labeled with a header bar entitled "Contacts" that identifies all of Art's contacts who are not shown in any of the first and second server application groups 72, 74 (i.e., they either are not members of or not present in any of Application 1 and Application 2). Each of the header bars includes a respective toggle control 84, 86, 88 that can be toggled to selectively collapse and expand the associated section 78, 80, 82.

In the exemplary embodiment shown in FIG. 3, the server application sections 78, 80 contain the graphical representations (avatars) of the communicants (including at least one of Art or Art's contacts) who currently have presence in the respective server applications, and the contacts section 82 contains the graphical representations (i.e., avatars) of all of the remaining ones of Art's contacts that are not present in or not members of any of Application 1 and Application 2. In the illustrated example: Art and Beth are members of server Application 1; Art, Carl, and Dan, are members of server Application 2, and Ed is a guest of server Application 2; and Fran, Garth, Helen, Jack, and Kim are not members of server Application 1 nor server Application 2. In this example, Dan, Fran, Garth, Helen, Jack, and Kim are contacts of Art, whereas Beth, Carl, and Ed are not contacts of Art.

Each communicant is represented graphically by a respective circular sprite that is labeled with a respective user name of the communicant (i.e., "Art," "Beth," "Carl," "Dan," "Ed," "Fran," "Garth," "Helen," "Jack," and "Kim"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 78, 80, 82 is alphabetical by user name. In other embodiments, the spatial positions of the communicant avatars in each of the server application sections 78, 80 are ordered in accordance with the temporal ordering of the communicants in terms of the times when the communicants established their respective presences with the server applications. The spatial positions of the communicant avatars in the contacts section 82 may be sorted alphabetically by user name, according to frequency of contact, according to recency of contact, or according to other sorting or filtering criteria.

The activities of the communicants in the contexts of the server applications may be inferred from the states of various communication channels over which the respective communicants are configured to communicate. The states of the communication channels are shown in the graphical user interface 70 by visual cues that are depicted in association with the graphical representations of the communicants in the sections 78, 80, 82. As in the embodiment shown in FIG. 2, the "on" or "off" state of a communicant's local speaker channel is depicted by the presence or absence of a headphones graphic 90 on the communicant's sprite. When the speakers of the communicant who is represented by the sprite are on, the headphones graphic 90 is present (see sprites Art, Carl, and Dan) and, when the communicant's speakers are off, the headphones graphic 90 is absent (see sprites Beth and Ed). The "on" or "off" state of the communicant's microphone is depicted by the presence or absence of a microphone graphic 90 on the communicant's sprite. When the microphone is on, the microphone graphic 90 is present (see sprite Dan); and, when the microphone is off, the microphone graphic 90 is absent (see sprites Art, Beth, Carl, and Ed). The headphones graphic 90 and the microphone graphic 92 provide visual cues of the activity states of the communicant's sound playback and microphone devices. The activity state of a communicant's text chat channel is depicted by the presence or absence of the hand graphic 94 adjacent the communicant's sprite (see sprite Beth). Thus, when a communicant is transmitting text chat data to another network node the hand graphic 94 is present, and when a communicant is not transmitting text chat data the hand graphic 94 is not present. In some embodiments, text chat data is transmitted only when keyboard keys are depressed, in which case the visualization of the communicant's text channel appears as a flashing on and off of the hand graphic 94.

In the example shown in FIG. 3, members of a server application are able to receive the visual cues of the communicant activities occurring in the context of that server application whether or not the member is present. Thus, the graphical user interface 70 that is presented to Art shows visual cues indicating the communication channel states of the communicants present in Application 1 (where Art is present) and the communication channel states of the communicants present in Application 2 (where Art is not present).

In the graphical user interface 70, Art's contacts are not duplicated across the server application and contacts groups 72-76. In other embodiments, the contacts group 76 may include all of Art's contacts regardless of whether or not they also are included in any of the server application groups 72, 74. For example, FIG. 4 shows an embodiment 106 of the graphical user interface 70 in which the contacts section 82 includes a contacts group 108 that includes all or a selected portion of Art's contacts. In the illustrated example, Dan appears both in the server Application 2 group 74 and the Contacts group 108.

Figure 5:
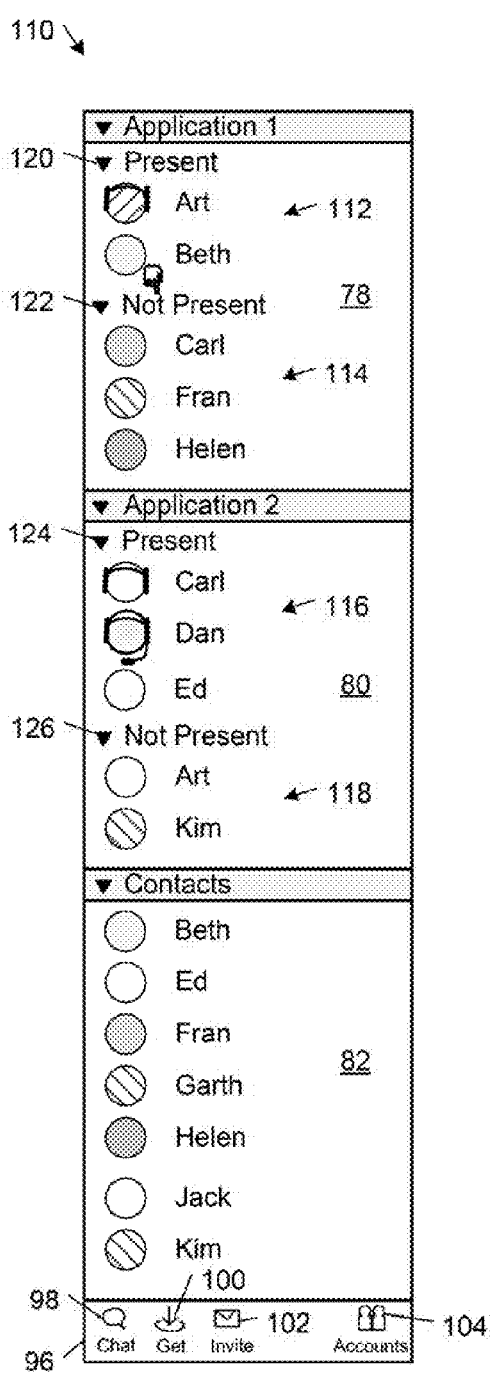
FIG. 5 is a diagrammatic view of an exemplary embodiment of a graphical user interface.

FIG. 5 shows another embodiment 110 of the graphical user interface 70 that depicts the realtime availabilities and activities of some or all of the contacts of a target communicant ("Art" in this example) across different communication contexts. In this embodiment, for each server application of which Art is a member and with respect to which at least one of Art and Art's contacts is present, the members of the server application are segmented by the status of their presence with respect to the server application. Thus, the members of Application 1 are sorted into a Present group 112 and a Not Present group 114, and the members of Application 2 are sorted into a Present group 116 and a Not Present group 118. In this way, Art readily can visualize who is present and which members are not present in each server application. Each of the groups 112-118 are labeled with a respective "Present" or "Not Present" label that is associated with a respective toggle control 120, 122, 124, 126 that can be toggled to selectively collapse and expand the associated group 112-114.

Figure 6:
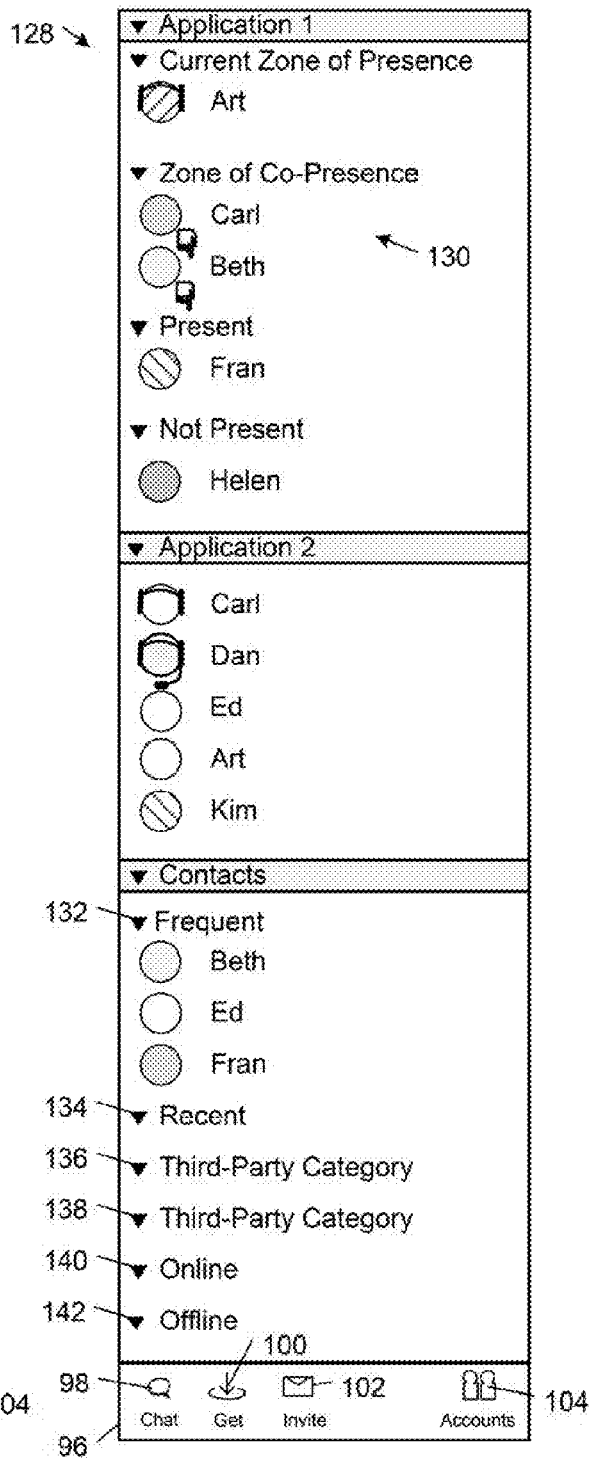
FIG. 6 is a diagrammatic view of an exemplary embodiment of a graphical user interface.

FIG. 6 shows an embodiment 128 of the graphical user interface 110 that depicts the realtime availabilities and activities of some or all of the contacts of a target communicant ("Art" in this example) across different communication contexts. This graphical user interface embodiment corresponds to the graphical user interface 110, except that it includes an additional "Zone of Co-Presence" server application filtering criterion and it includes additional filtering criteria for filtering the communicants listed in the Contacts group.

The Zone of Co-Presence filtering criteria identifies those communicants who are co-present within a particular zone of a server application. Thus, for each server application, each group of two or more communicants who are present within the same zone of the server application is listed in a separate, selectively expandable and collapsible Zone of Co-Presence area 130 of the graphical user interface 128. The depiction of the zones of co-presence involving some or all of Art's contacts enables Art to readily visualize all of the conversations that are occurring across all of the communication contexts that are defined by the server applications of which Art is a member. In this way, Art can determine whether or not there are any ongoing conversations that he would like to join.

The additional filtering criteria include a Frequent contacts group 132 in which Art's contacts are sorted by the frequency of their respective interactions with Art, a Recent contacts group 134 in which Art's contacts are sorted by the recentness of their respective interactions with Art, a pair of Third-Party Categories 136, 138 in which Art's contacts are filtered according to different categories defined by third-party services (such as instant messaging applications or social networks), an Online contacts group 140 that lists all of Art's contacts who currently are online (i.e., connected to the network 20), and an Offline contacts group 142 that lists all of Art's contacts who currently are offline (i.e., disconnected from the network 20).

Each of the graphical user interface embodiments 70, 106, 110, and 128 (see FIGS. 3-6) includes a respective toolbar 96 that includes a Chat button 98, a Get button 100, an Invite button 102, and an Accounts button 104. The functions that can be invoked by selection of these control buttons are described below in connection with FIGS. 7A-7C.

Selection of the Chat button 98 (FIG. 7A) opens a Chat window 150 (FIG. 7B) that enables Art to initiate a chat with other communicants that are present in the server application where Art is present (i.e., Application 1 in the illustrated example). In response to a selection of the chat button 98, a separate chat window 150 is opened. The chat window 150 includes a toolbar 152, a chat log area 154, a text box 156, and a Send button 158. The chat window 150 also includes an integrated People Pane 159 Additional details regarding embodiments of the methods and functions invoked by the Chat button 98 are described in §IV.B.2 of U.S. patent application Ser. No. 12/354,709, filed Jan. 15, 2009.

Selection of the Get button 100 (FIG. 7A) opens a Get window 160 (FIG. 7C) that enables Art to invite one or more communicants to a selected Location 161 (e.g., a server application or zone within that server application). For each server application other than the one of Art's current focus, the Get window 160 includes a recipient field 162 that lists the people that were selected in the Contact List 110 when the Get button was clicked. In addition, Art can type any email address, name, or other handle into the recipient field. The system will look up the email address, name, or other handle and (if the system recognizes the email address, name, or other handle) it will paint the recipient's avatar in the recipient field. In response to the selection of the Send button 166, the platform transmits to each of the selected communicants a respective invitation to join Art in the selected Location 161. The message is sent to the recipient via a chat message or email message (or both) depending on the recipient's availability at the time. Art has the option of including a Message 168 (e.g., "Please join me in Application 1") with the invitation.

Selection of the Invite button 102 opens an Invite window (not shown) that enables Art to invite to the current server application a communicant who is not present in the current server application. In response to Art's selection of one or more of the communicants in the list of available communicants, the platform transmits an invitation to the selected communicant to join Art in the respective server application or zone. Additional details regarding embodiments of the methods and functions invoked by the Invite button 102 are described in §IV.B.4 of U.S. patent application Ser. No. 12/354,709, filed Jan. 15, 2009, in connection with the get button of the contacts window.

Selection of the Accounts button 104 opens an Accounts window (not shown) that enables Art to manage his account information.

Figure 7A:
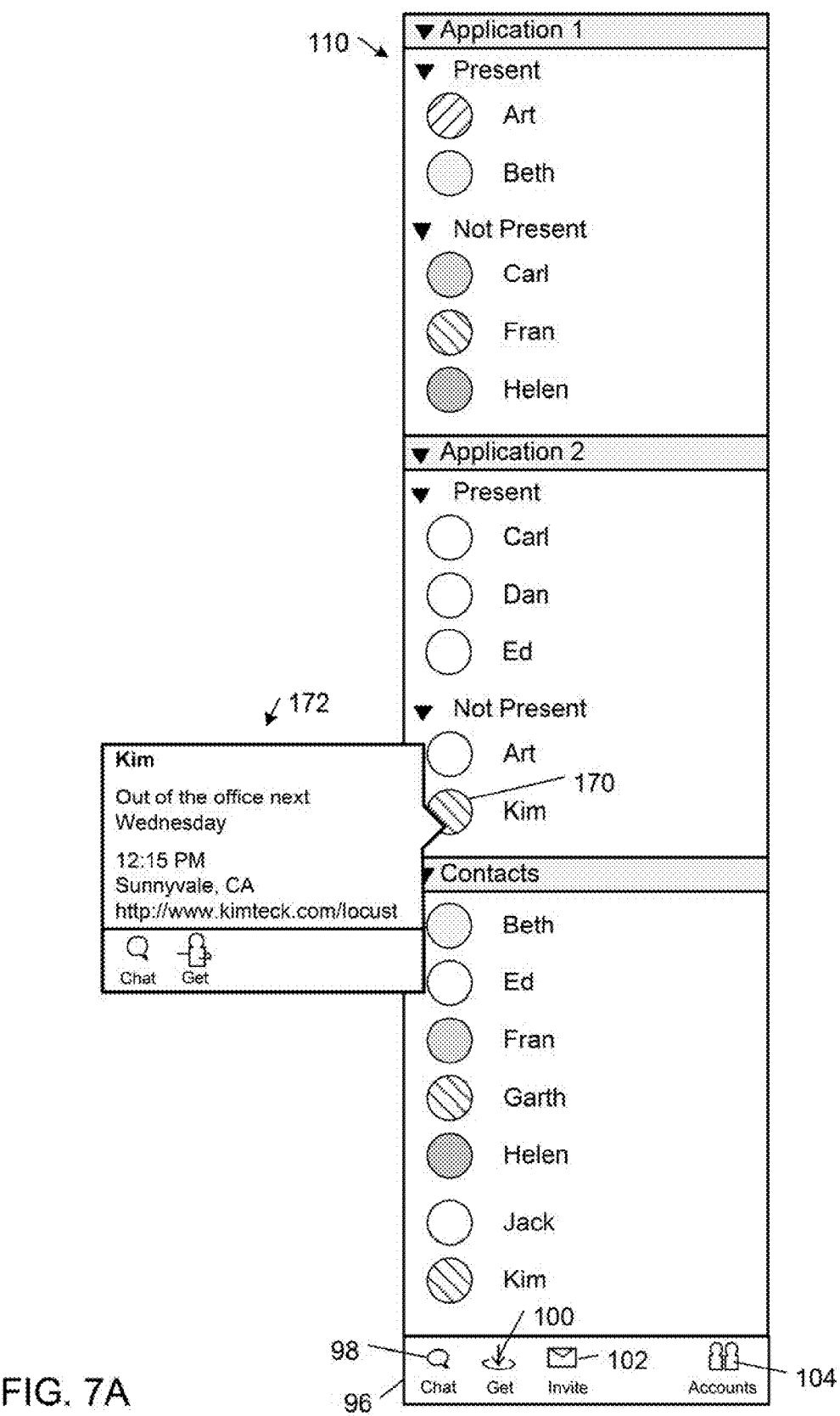
FIG. 7A is a diagrammatic view of an exemplary embodiment of a graphical user interface.

Art also may mouseover any of the graphical representations of the communicants listed in the graphical user interfaces 70, 106, 110, and 128 to reveal additional information about the respective communicant. For example, as shown in FIG. 7A, in response to a mouseover Kim's sprite 170, an information window 172 is presented that shows information about Kim. In this example, the information window 172 shows a message from Kim (i.e., "Out of the office next Wednesday"), local time information, location information, and a hypertext link. The information window 172 also includes a toolbar that has a Chat button for initiating a chat with Kim and a Get button to invite Kim to a selected location. Additional details regarding embodiments of the methods and functions invoked by the Chat button and the Get button are described respectively in §§IV.B.2 and IV.B.4 of U.S. patent application Ser. No. 12/354,709, filed Jan. 15, 2009.

C. Interfacing Communicants to the Network Communication Environment

1. Overview

Figure 8:
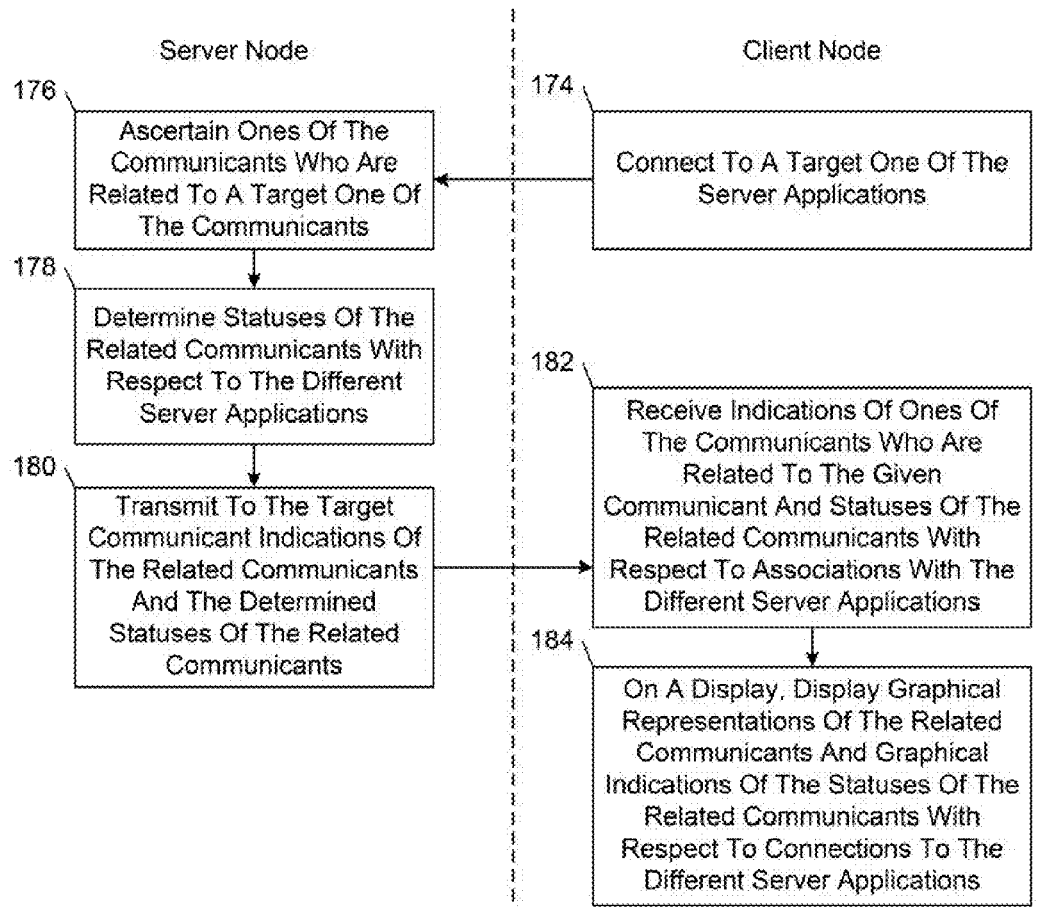
FIG. 8 is a flow diagram of an exemplary embodiment of a method of promoting communicant interactions in a network communications environment.

FIG. 8 shows an exemplary embodiment of a method by which the platform promotes interactions between a target communicant operating a respective one of the client nodes 12, 14 and other communicants in the network communication environment. In accordance with this method, the target communicant directs the client node to connect to a target one of the server applications 44 (FIG. 8, block 174). The server node hosting the target server application ascertains ones of the communicants that are related to the target communicant (FIG. 8, block 176). The server node determines statuses of the related communicants with respect to the different server applications 44 (FIG. 8, block 178). The server node transmits to the target communicant indications of the related communicants and the determined statuses of the related communicants (FIG. 8, block 180). On a display, the client node displays graphical representations of the related communicants and graphical indications of the statuses of the related communicants with respect to connections to the different server applications (FIG. 8, block 184).

As explained above, in some embodiments, multiple of the different server applications respectively enable synchronous conferencing between respective ones of the communicants.

A given one of the server applications may have multiple zones with respect to each of which respective ones of the communicants are able to be associated. In these embodiments, the server node typically transmits to the target communicant indications of which of the zones of the given server application respective ones of the related communicants are associated. For each of the related communicants, the server node may determine each of the zones with respect to which the related communicant is co-present with at least one other communicant; and the server node transmits indications of the determined memberships of the related communicants to the target communicant. In some embodiments (described below), each of the zones of the given server application is associated with a respective graphical representation of an element of a physical environment. For example, each of the zones of the given server application may be associated with a respective graphical representation of a physical space of an office environment.

In some embodiments, the server node may, for each of the related communicants, determine each of the server applications of which the related communicant has a membership, and the server node transmits to the target communicant indications of the determined memberships of the related communicants.

In the ascertaining of the related communicants (FIG. 8, block 176), the server node may identify as related communicants ones of the communicants with whom the target communicant has interacted in association with respective ones of the server applications. In this process, the server node may identify as related communicants ones of the communicants with whom the target communicant has communicated through realtime communication facilities provided in association with respective ones of the server applications. The realtime communication facilities may include at least one of an audio communications facility, a video communications facility, a realtime text chat communications facility, and a file sharing communications facility.

In the ascertaining of the related communicants, the server node may identify ones of the communicants that the target has claimed as a contact as "related communicants."

The server node may transmit to the target communicant indications of ones of the related communicants that currently are connected to the network communication environment and respective indications of ones of the related communicants that currently are unconnected to the network communication environment.

In some embodiments, the process of determining the statuses of the related communicants (FIG. 8, block 178) involves, for each of the related communicants, determining each of the server applications with which the related communicant has a presence. The server node typically transmits to the target communicant indications of which of the server applications the related communicants respectively have presence. In some embodiments, a given one of the server applications has multiple zones with respect to each of which respective ones of the communicants are able to establish respective presences and, for each of the related communicants, the server node determines each of zones of the given server application with which the related communicant has a presence, and transmits to the target communicant indications of which of the zones of the given server application the related communicants respectively have presence.

In some embodiment the server node sorts the related communicants and transmits an indication of the sorting to the target communicant. In some embodiments, the sorting involves grouping the related communicants into server application groups according to the server applications with which respective ones of the related communicants are associated. Within each server application group, the server node may sort the respective ones of the related communicants by status of connection to the respective server applications, by frequency of interaction with the target communicant in the network communication environment, or by recentness of interaction with the target communicant in the network communication environment. In some embodiments, a given one of the server applications has multiple zones with respect to each of which respective ones of the communicants are able to establish respective presences. In these embodiments, the grouping may involve grouping the respective ones of the related communicants associated with the given server application into zone groups according to the ones of the zones of the given server application with which respective ones of the related communicants are associated. The grouping may involve grouping the respective ones of the related communicants associated with the given server application according to the ones of the zones in which at least two of the related communicants are co-present. In some embodiments, the sorting involves sorting the zone groups according to which of the zones of the given server application the target communicant has presence. In some embodiments, the sorting involves grouping the related communicants according to their respective connection statuses with respective ones of the server applications. The sorting may involve grouping together ones of the related communicants that are unconnected to all of the server applications.

In some embodiments, the server node determines realtime activity states of respective ones of the related communicants, and transmits indications of the determined realtime activity states to the target communicant. The determining may involve determining realtime communication activities of respective ones of the related communicants (e.g., an audio communications activity, a video communications activity, a realtime text chat activity, and a file sharing activity).

In some embodiments, the server node determines communication channels that are available for communicating with respective ones of the related communicants in association with respective ones of the server applications. In these embodiments, the server node transmits to the target communicant indications of the determined communication channels in association with the respective ones of the related communicants and the respective ones of the server applications. The determining of the available communication channels may involve comparing realtime communication capabilities of respective ones of the related communicants and realtime communication facilities enabled by respective ones of the server applications. In some embodiments, the realtime communication channels include at least one of an audio communications channel, a video communications channel, a realtime text chat channel, and a file sharing channel.

In some embodiments, the indications received by the client node (FIG. 8, block 182) include indications of which of the server applications the related communicants respectively have presence. In these embodiments, the client node typically displays the graphical representations of the related communicants in association with the respective ones of the server applications with which the related communicants have presence. In some embodiments, a given one of the server applications has multiple zones with respect to each of which respective ones of the communicants are able to establish respective presences. In these embodiments, the indications received by the client node typically include, for each of the related communicants, a respective indication of each of zones of the given server application with which the related communicant has a presence. In this case, the client node typically displays the graphical representations of the related communicants in association with the respective ones of the zones of the given server application with which the related communicants have presence. In some embodiments the client node displays the zones as respective graphical representations of elements of a physical environment (e.g., an office environment).

The indications received by the client node typically include indications of the server applications with which respective ones of the related communicants are associated. In some embodiments, the client node displays the graphical representations of the related communicants grouped into server application groups according to the server applications with which respective ones of the related communicants are associated. Within each server application group, the client node may display the graphical representations of the respective ones of the related communicants sorted by status of connection to the respective server applications, by frequency of interaction with the given communicant in the network communication environment, or by recentness of interaction with the given communicant in the network communication environment.

In some embodiments, a given one of the server applications has multiple zones with respect to each of which respective ones of the communicants are able to establish respective presences. In these embodiments, the client node may display the graphical representations of the respective ones of the related communicants associated with the given server application grouped into zone groups according to the ones of the zones of the given server application with which respective ones of the related communicants are associated. In this process, the client node may display the graphical representations of the respective ones of the related communicants associated with the given server application grouped according to the ones of the zones in which at least two of the related communicants are co-present. The client node may display the zone groups sorted according to which of the zones of the given server application the given communicant has presence. The client node may display the graphical representations of the related communicants grouped according to their respective connection statuses with respective ones of the server applications. In this process, the client node may display grouped together the graphical representations of ones of the related communicants that are unconnected to all of the server applications.

In some embodiments, indications received by the client node include indications of realtime activity states of respective ones of the related communicants. In these embodiments, the client node may display graphical indications of the realtime activity states in association with respective ones of the graphical representations of the related communicants. The realtime communication activities typically include at least one of an audio communications activity, a video communications activity, a realtime text chat activity, and a file sharing activity.

In some embodiments, the indications received by the client node include indications of communication channels available for communicating with respective ones of the related communicants in association with respective ones of the server applications. In these embodiments, the client node may display graphical indications of the communication channels in association with the graphical representations of the respective ones of the related communicants. The realtime communication channels typically include at least one of an audio communications channel, a video communications channel, a realtime text chat channel, and a file sharing channel.

The indications received by the client node may include indications of ones of the related communicants that are connected to the network communication environment and indications of ones of the related communicants that are unconnected to the network communication environment. In these embodiments, the client node may display an online connection status indicator in association with the graphical representations of ones of the related communicants that are connected to the network communication environment, and the client node may display an offline connection status indicator in association with the graphical representations of ones of the related communicants that are unconnected to the network communication environment.

Figure 9:
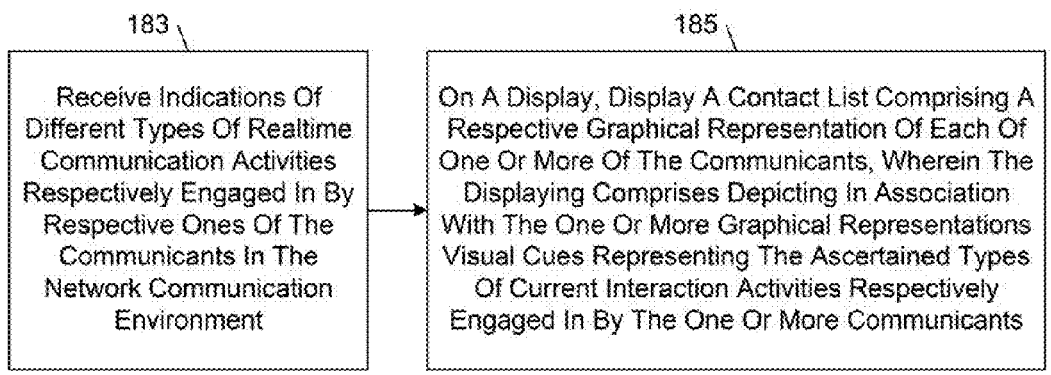
FIG. 9 is a flow diagram of an exemplary embodiment of a method of promoting communicant interactions in a network communications environment.

FIG. 9 shows an exemplary embodiment of a method by which the platform promotes interactions between a given communicant operating a respective one of the client nodes 12, 14 and other communicants in the network communication environment. In accordance with this method, a client node receives indications of different types of realtime communication activities respectively engaged in by respective ones of the communicants in the network communication environment (FIG. 9, block 183). On a display, the client node displays a contact list that includes a respective graphical representation of each of one or more of the communicants, wherein the displaying comprises depicting in association with the one or more graphical representations visual cues representing the ascertained types of current interaction activities respectively engaged in by the one or more communicants.

In some embodiments, the client node receives a realtime data stream comprising content derived from a communication activity of a respective one of the communicants and a respective indication in the form of content type identifier identifying a type of the received realtime data stream. In these embodiments, the client node determines the respective type of the realtime communication activity from the respective content type identifier. The client node also typically generates a human perceptible output from the received realtime data stream.

In some embodiments, the client node receives an indication of a realtime chat activity engaged in by a given one of the communicants in the network communication environment, and displays a visual cue indicative of the realtime chat activity in association with the graphical representation of the given communicant.

In some embodiments, the client node receives an indication of a realtime file sharing activity engaged in by a given one of the communicants in the network communication environment, and displays a visual cue indicative of the realtime file sharing activity in association with the graphical representation of the given communicant.

In some embodiments, the client node receives an indication of a realtime application sharing activity engaged in by a given one of the communicants in the network communication environment, and displays a visual cue indicative of the realtime application sharing activity in association with the graphical representation of the given communicant.

In some embodiments, the client node receives an indication of a realtime voice activity engaged in by a given one of the communicants in the network communication environment, and displays a visual cue indicative of the realtime voice activity in association with the graphical representation of the given communicant.

2. Communicant Associations with Each Other and with Server Applications

A communicant typically is related to another communicant by being a "contact" of the other communicant, where the communicant is connected to the other communicant by either an explicit social network tie that is declared by at least one of the communicants (and optionally confirmed by the other) or by a social network tie that is inferred from interactions between the communicants. In some embodiments, the network infrastructure service environment 42 promotes communicant interactions based on explicit attribute values that are declared by communicants and inferred attribute values that are derived from statistical analyses of the results of queries on the relationship database 46. Each relationship type attribute value typically specifies a type of a social network tie. Exemplary relationship types include a kinship type (e.g., father-of, cousin-of), an affective type (e.g., respects, likes), a cognitive type (e.g., knows, friends-with, acquaintance-of), and social role type (e.g., teacher-of, works-with). Examples of embodiments of methods of inferring such attribute values are described in section IV of co-pending U.S. patent application Ser. No. 12/631,026, filed Dec. 4, 2009.

Among the exemplary types of associations communicants may have with the different server applications are membership and presence. A communicant typically becomes a member of a server application by registering with the server application. A communicant may be a member of a server application without currently having a presence with respect to the server application. A communicant typically acquires a presence with respect to a server application by connecting to the server application. A communicant may have a presence with respect to a server application without being a member of that server application; in this case the communicant typically is referred to as a "guest." In some embodiments, some guest communicants may be interfaced with a server application in accordance with one or more of the methods described in U.S. patent application Ser. No. 12/694,126, filed Jan. 26, 2010.

Figure 10:
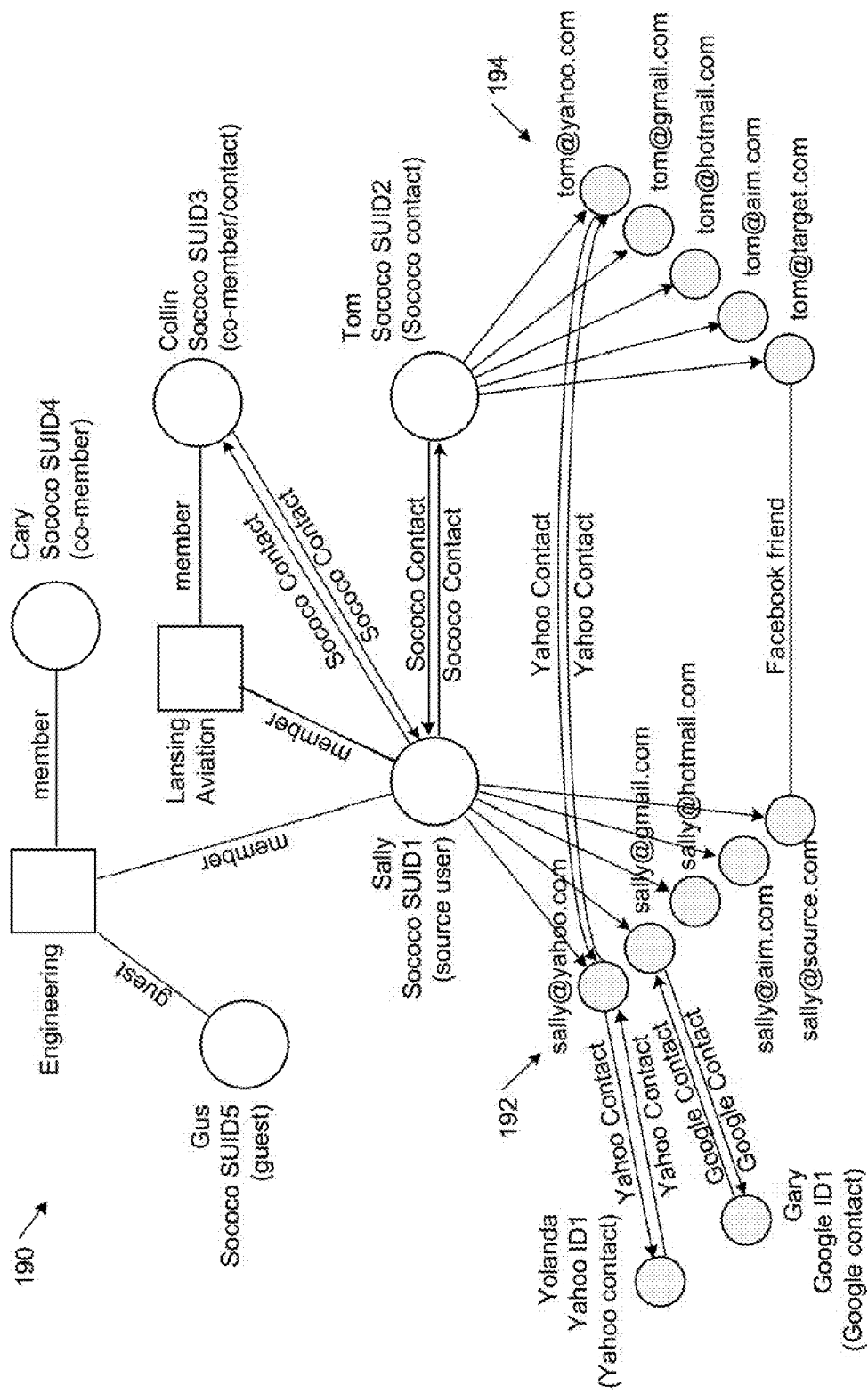
FIG. 10 is a diagrammatic view of an example of a social graph.

FIG. 10 shows an example of a social graph 190 that illustrates an exemplary set of relationships between five communicants (Sally, Tom, Collin, Cary, and Gus) and their respective associations with two server applications (Lansing Aviation and Engineering). The server applications may be any type of server application with respect to which the communicants may establish a respective presence, including synchronous conferencing server applications. In the illustrated example, the Lansing Aviation and Engineering server applications are Sococo area applications (available from Social Communications Company, Inc., www.sococo.com), which define respective spatial visualizations and switching rules for communicant interactions in respective spatial contexts that increase the level of immersion experienced by the communicants in the network communication environment. As shown in the social graph 190, Sally and Cary are members of the Engineering area application and Gus is a guest of the Engineering area application. Sally also is a joint member of the Lansing Aviation area application with Collin, who is a mutual Sococo contact of Sally. Sally is a mutual Sococo contact of Tom, who is not a member of any of the Lansing Aviation and Engineering area applications. Sally also is a mutual Yahoo contact of Yolanda and a mutual Google contact of Gary.

3. Communicant Identity

For each server application, a communicant may have one or more identifiers that uniquely identify the communicant to the server application. For example, the social graph of FIG. 10 shows that in addition to having respective Sococo identities that are uniquely identified by the Sococo identifiers SUID1 and SUID2, Sally and Tom also claim respective sets 192, 194 of identities that they have established with third-party server providers (i.e., Yahoo, Gmail, Hotmail, AIM, and Facebook service providers). In particular, Sally has claimed the following identity identifiers: sally@yahoo.com, sally@gmail.com, sally@hotmail.com, sally@aim.com, and sally@source.com; and Tom has claimed the following identity identifiers: tom@yahoo.com, tom@gmail.com, tom@hotmail.com, tom@aim.com, and tom@target.com.

Sally and Tom also are mutual Yahoo contacts and mutual Facebook contacts (also referred to as "friends"). In this example, the identities claimed by Sally and Tom are respective communications handles for communicating in connection with respective network services (i.e., Yahoo, Gmail, Hotmail, AIM, and Facebook server applications).

In some embodiments, for each communicant, the network infrastructure service environment 42 associates all of the identities that are claimed by the communicant with a single respective universal user identifier (e.g., the Sococo identifiers SUID1 and SUID2 shown in FIG. 10) that identifies the communicant in the network communication environment. In this way, each communicant is identified consistently with the same identifier across all the different communication contexts that are defined by the different server applications 44.

Figure 11:
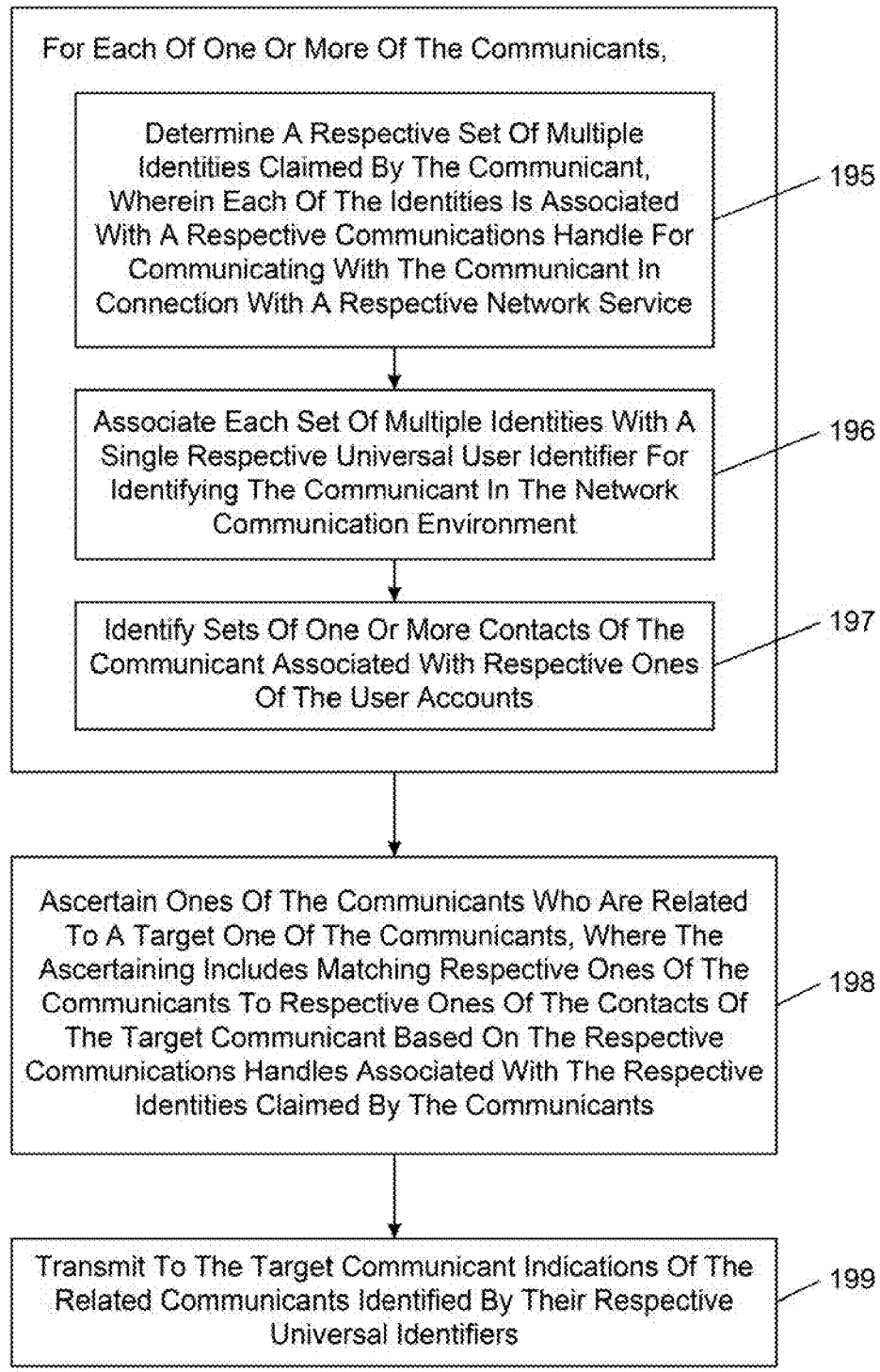
FIG. 11 is a flow diagram of an exemplary embodiment of a method of promoting communicant interactions in a network communications environment.

FIG. 11 shows an embodiment of a method by which the network infrastructure server environment 42 represents each of one or more of the communicants to other communicants interacting in the network communication environment with a single respective identity.

In accordance with the method of FIG. 11, for each of one or more of the communicants: the network infrastructure server environment 42 determines a respective set of multiple identities claimed by the communicant, where each of the identities is associated with a respective communications handle for communicating with the communicant in connection with a respective network service (FIG. 11, block 195); the network infrastructure server environment 42 associates each set of multiple identities with a single respective universal user identifier for identifying the communicant in the network communication environment (FIG. 11, block 196); and the network infrastructure server environment 42 identifies sets of one or more contacts of the communicant associated with respective ones of the user accounts (FIG. 11, block 197).

The network infrastructure server environment 42 ascertains ones of the communicants that are related to a target one of the communicants (FIG. 11, block 198). In this process, respective ones of the communicants are matched to respective ones of the contacts of the target communicant based on the respective communications handles associated with the respective identities claimed by the communicants.

The network infrastructure server environment 42 transmits to the target communicant indications of the related communicants identified by their respective universal identifiers (FIG. 11, block 199).

In some embodiments, the connection handles are handles for communicating with respective ones of the communicants via realtime communications services (e.g., an instant messaging service, an audio conferencing service, a video conferencing service, and a file sharing service), via electronic mail services, or via social networking services. In some embodiments, each communicant may specify a different respective communication handle for different ones of the server applications 44 so that the communicant can infer the communication context of messages (e.g., Meet, Get, and Invite messages) received from other communicants from the communication handle to which the messages are directed.

In some embodiments, the network infrastructure service environment 42 determines connection statuses of the related communicants with respect to connections to the server applications, and transmits to the target communicant a specification of the related communicants and the determined connection statuses of the related communicants. In response to a determination that a given one of the related communicants has disconnected from a given one of the server applications, the network infrastructure service environment 42 determines to which of the network services the given related communicant is connected, and transmits to the target communicant an indication that the given related communicant is disconnected from the given server application and an indication of that the given related communicant is available for communication via one or more of the network services to which the given related communicant is determined to be connected.

4. Communicant Status

Among the statuses that can be ascertained about a communicant with respect to associations with the different server applications 44 are statuses of the states and activities of the communicant with respect to the server applications 44.

Exemplary communicant states include:

| STATE | DESCRIPTION | ATTRIBUTES |
|---|---|---|
| Online/Offline State | Is this communicant available now? | Online/Offline |
| Location of Presence | Where is this communicant? | Application (or Zone within Application) of Primary Focus |
| Application-Specific Identity Information | Who is this communicant? | Name |
| | | Avatar Color |
| | | Photo |
| | | Status Message |
| | | Role (e.g., Guest, Member, Moderator, Owner) |
| Application-specific Availability | Is this person available now? | Idle/Sleeping |
| | | Busy |
| Channels Supported by Client of Focus | How can I communicate with this communicant? | Chat |
| | | Audio Sink (e.g., Speaker) |
| | | Audio Source (e.g., Microphone) |
| | | Video Sink (e.g., Display) |
| | | Video Source (e.g., Screen Share) |
| | | Video Source (e.g., Webcam) |
| | | File Transfer |
| Client of Focus | Which network service is communicant currently using? | Client Name (e.g., Sococo, Yahoo!, Windows Live Messenger, Google Talk, Facebook, etc.) |
| | | Client Version |
| Station of Focus | Which client network node is communicant currently using? | Operating System (e.g., XP, Vista, Windows 7, MacOS, iPhone, Windows Mobile, etc.) |
| | | OS Version |
| | | Device Type (e.g., Desktop Computer, Smart Phone, Phone, etc.) |

The Online/Offline state indicates whether or not the communicant currently is available for communication. In the illustrated embodiments, a communicant is in the Online state when the communicant is connected to the network communication environment (e.g., by establishing a presence with respect to one or more of the server applications 44), and the communicant is in the Offline state when the communicant is unconnected to the network communication environment (e.g., by not having a presence with respect to any of the server applications 44).

The Location of Presence state indicates where the communicant has established a presence in the network communication environment. The Location of Presence typically has a respective attribute value (e.g., an application_ID and/or a zone_ID value) for each of the server applications 44 and/or zones of the server applications 44 in which the user has presence.

The Application-Specific Identity Information is communicated to other communicants to indicate information about the communicant in the context of a particular server application with which the communicant is associated. The Application-Specific Identity Information includes:

an application-specific Name attribute that is used to identify the communicant to other communicants in the context of the server application;
  an application-specific Avatar Color attribute that is used to set the color of an iconographic representation of the communicant in the context of the server application;
  an application-specific Photo attribute that references a user-selected image that is associated with representations of the communicant in the context of the server application;
  an application-specific Status Message attribute that references a message that is associated with representations of the communicant in the context of the server application; and
  an application-specific Role attribute that indicates a role (e.g., Guest, Member, Moderator, Owner) of the communicant that may be used for switching data streams to communicants in the context of the server application.

The Application-Specific Availability state indicates the availability of the communicant in the context of the server application. The Application-Specific Availability state typically includes an attribute value that indicates when the communicant is idle or sleeping and an attribute value that indicates when the communicant is busy.

The Station of Focus state characterizes the client network node from which the communicant is operating. The Station of Focus state typically includes attributes that identify the Device Type of the client network node, the Operating System (OS) running on the client network node, and the OS Version of the operating system.

The Client of Focus state indicates the server application with which the communicant currently has focus. The Client of Focus state typically includes a Client Name attribute that identifies client communication application with which the communicant is communicating with the server application, and a Client Version attribute that identifies the version of the client communication application.

The Channels Supported by Client of Focus state indicates the communication channels that are available for communicating with the communicant in the context of the user's client application. The Channels Supported by Client of Focus state typically includes a Chat attribute that indicates whether or not the user's client application supports chat communications with the communicant, Audio Sink and Audio Source attributes that respectively indicate whether or not the user's client application supports audio sink and audio source communications with the communicant, Video Source and Video Sink attributes that respectively indicate whether or not the user's client application supports video sink and video source communications with the communicant, and File Transfer attribute that indicates whether or not the user's client application supports file transfer communications with the communicant.

Exemplary communicant activities include the channels that the communicant currently has open for communication, which indicates how the communicant currently is interacting with other communicants. In some embodiments the Open Channels activity includes the following attributes:

an IsListening attribute that indicates when the communicant's audio sink channel (e.g., speaker) is open;
  a HasMicOpen attribute that indicates when the communicant's audio source channel (e.g., microphone) is open;
  an IsSpeaking attribute that indicates when the amplitude of the audio being transmitted on the communicant's audio source channel;
  an IsWatching attribute that indicates when video data being streamed to the communicant's video sink channel is displayed on the screen;
  an IsTyping attributes that indicates when a user is actively typing into an input box for the communicant's chat channel;
  a HasApplicationShareFocus attribute that indicates when application sharing data is being streamed to the communicant on the communicant's application sharing video sink channel;
  a HasWebCamOn attribute that indicates when the communicant's webcam video source channel is open;
  a HasChatInputFocus attribute that indicates when the communicant's client network node indicates that the communicant has focus on the communicant's chat channel; and
  an ObjectOfFocus attribute that indicates what object in a zone the communicant is looking at in the Viewer pane.

5. Virtual Areas

In some embodiments, the platform administers the realtime connections with network nodes in a communication context that is defined by an instance of a virtual area. The virtual area instance may correspond to an abstract virtual space that is defined with respect to abstract coordinates (e.g., coordinates that are defined by positions in the associated computer data file or software application, or in an embodiment in which a customer service database is an area, each record in the database constitutes a zone). Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

Figure 12:
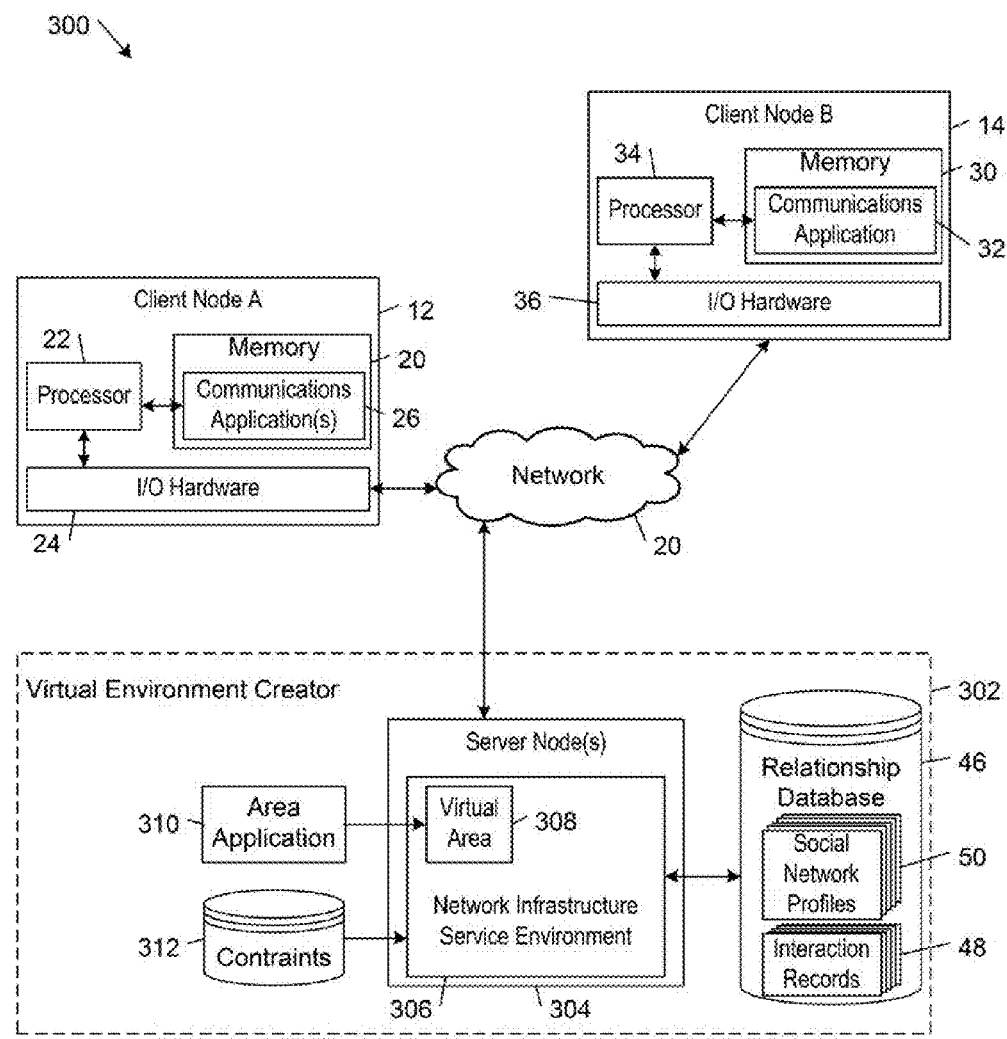
FIG. 12 is a diagrammatic view of an exemplary embodiment of the network communications environment shown in FIG. 1.

FIG. 12 is a diagrammatic view of an embodiment 300 of the network communication environment 10 (see FIG. 1) that includes a network infrastructure service environment 306 that manages sessions of the first and second client nodes 12, 14 in a virtual area 308 in accordance with an area-based server application 310 (referred to herein as "virtual area application"). The virtual area application 310 is hosted by the virtual area 308 and includes a description of the virtual area 308. The communications applications 26, 32 operating on the first and second client network nodes 12, 14 present respective views of the virtual area 308 in accordance with data received from the network infrastructure service environment 306 and provide respective interfaces for receiving commands from the communicants and providing a spatial interface that enhances the realtime communications between the communicants. The communicants typically are represented in the virtual area 308 by respective avatars, which typically move about the virtual area 308 in response to commands that are input by the communicants at their respective network nodes. Each communicant's view of the virtual area 308 typically is presented from the perspective of the communicant's avatar, which increases the level of immersion experienced by the communicant. Each communicant typically is able to view any part of the virtual area 308 around his or her avatar. In some embodiments, the communications applications 26, 32 establish realtime data stream connections between the first and second client network nodes 12, 14 and other network nodes sharing the virtual area 308 based on the positions of the communicants' avatars in the virtual area 308.

Figure 18:
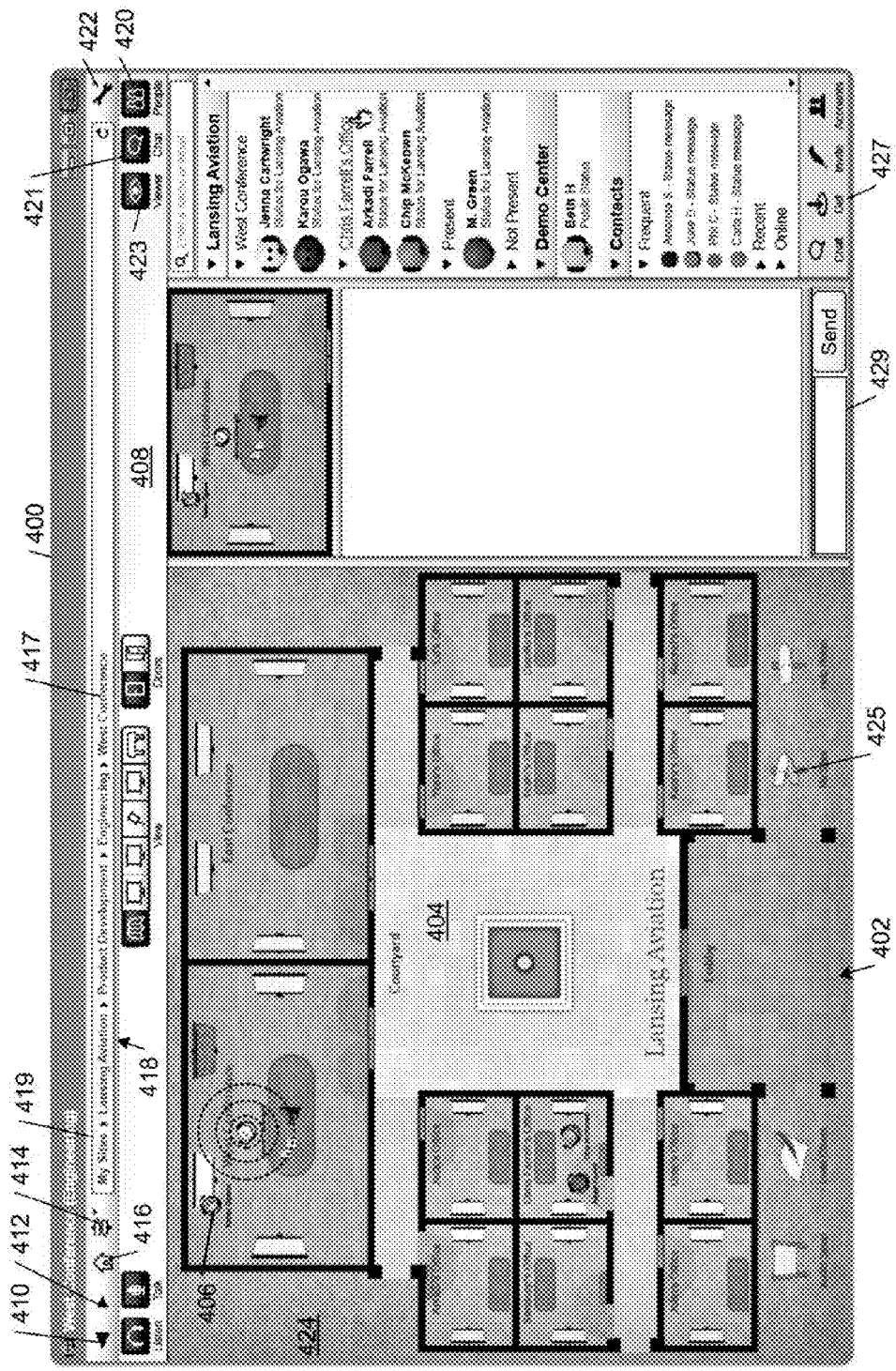
FIG. 18 is a diagrammatic view of an exemplary embodiment of a graphical user interface.

The network infrastructure service environment 306 typically includes one or more network infrastructure services that cooperate with the communications applications 26, 32 in the process of establishing and administering network connections between the client nodes 12, 14 and other network nodes (see FIGS. 1 and 18). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 306 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 300.

Area Service

The area service administers virtual areas. In some embodiments, the area service remotely configures the communications applications 26, 32 operating on the first and second client network nodes 12, 14 in accordance with the virtual area application 308 subject to a set of constraints 312 (see FIG. 12). The constraints 312 typically include controls on access to the virtual area. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area subject to the capabilities of the requesting entities, maintains global state information for the virtual area, and serves as a data server for the client network nodes participating in a shared communication session in a context defined by the virtual area 308. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 308 on the client network node in accordance with the virtual area application 310. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

Interaction Service

The interaction service maintains the relationship database 46 that contains the records 48 of interactions between communicants. For every interaction between communicants, one or more services of the network infrastructure service environment 306 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared.

The interaction service also supports queries on the relationship database 46 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database 36 can be combined with other searches. For example, queries on the relationship database may be combined with queries on contact history data generated for interactions with contacts using a communication system (e.g., Skype, Facebook, and Flickr) that is outside the domain of the network infrastructure service environment 306.

The communications application 26 and the network infrastructure service environment 306 typically administer the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars (e.g., sprites) in a virtual area that has an associated visualization. The avatars move about the virtual area in response to commands that are input by the communicants at their respective network nodes. In some embodiments, the communicant's view of a virtual area instance typically is presented from the perspective of the communicant's avatar, and each communicant typically is able to view any part of the visual virtual area around his or her avatar, increasing the level of immersion that is experienced by the communicant.

A virtual area typically includes one or more zones that are associated with respective rules that govern the switching of realtime data streams between the network nodes that are represented by the avatars in the virtual area. The switching rules dictate how local connection processes executing on each of the network nodes establishes communications with the other network nodes based on the locations of the communicants' avatars in the zones of the virtual area. A virtual area typically is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area are described in accordance with the COLLADA—Digital Asset Schema Release 1.4.1 April 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of a visual virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. No. 12/418,243 (which was filed on Apr. 3, 2009), Ser. No. 11/923,629 (which was filed on Oct. 24, 2007), and Ser. No. 11/923,634 (which was filed on Oct. 24, 2007).

Figure 13:
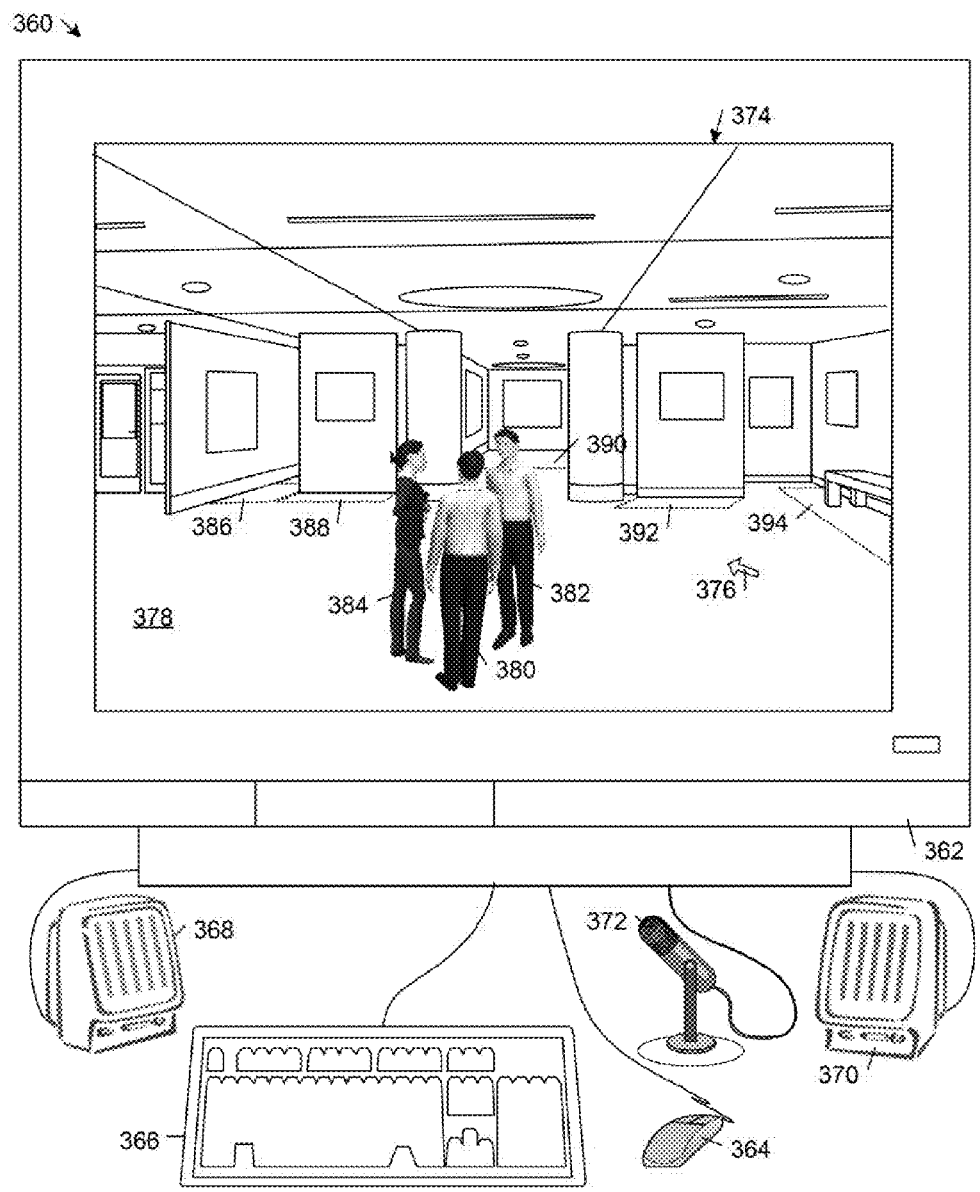
FIG. 13 is a diagrammatic view of an embodiment of a client network node.

FIG. 13 shows an embodiment of an exemplary network node that is implemented by a computer system 360. The computer system 360 includes a display monitor 362, a computer mouse 364, a keyboard 366, speakers 368, 370, and a microphone 372. The display monitor 362 displays a graphical user interface 374. The graphical user interface 374 is a windows-based graphical user interface that can include multiple windows, icons, and a pointer 376. In the illustrated embodiment, the graphical user interface 374 presents a two-dimensional depiction of a shared virtual area 378 that is associated with a three-dimensional visualization representing an art gallery. Communicants are represented in the virtual area 378 by respective avatars 380, 382, 384, each of which may have a respective role (e.g., a curator, an artist, and a visitor) in the context of the virtual area 378.

The virtual area 378 includes zones 386, 388, 390, 392, 394 that are associated with respective rules that govern the switching of realtime data streams between the network nodes that are represented by the avatars 380-384 in the virtual area 378. (During a typical communication session, the dashed lines demarcating the zones 386-394 in FIG. 13 are not visible to the communicants although there may be visual cues associated with such zone boundaries.) The switching rules dictate how local connection processes executing on each of the network nodes establishes communications with the other network nodes based on the locations of the communicants' avatars 380-384 in the zones 386-394 of the virtual area 378.

Some embodiments of the platform enable software application designers to define the semantics of position in a software application or a computer data file. Through associations with respective connection rules, these position definitions can be used, for example, to drive connections to virtual areas, entries into virtual areas, connections to communicants and other sources or sinks of realtime data streams, and determinations of presence data relating to communicants, network resources, and network services.

A "connection rule" designates at least one of a virtual area and a connection target, and includes an optional set of one or more connection conditions that guides the behavior of a suitably configured software application or service in initiating network connections. A "connection target" refers to an identifier or connection handle (e.g., a uniform resource identifier (URI)) that can be used to establish a network connection with a communicant, resource, or service on a network node. A "connection condition" specifies one or more parameters that influence the establishing of a network connection, the managing of a network connection, or the processing of data transferred across a network connection. For example, a connection condition may describe a predicate on the operating environment that should be satisfied before a network connection is attempted or established.

A computer data file is any block of information that durably stores data for use by a software application (e.g., information used as input, and/or written as output for a software application). A computer data file may be designed for use with any type of software application, including consumer and business software applications, and may be stored in any type of open or closed data file format. A computer data file is composed of one or more components whose contents and structures depend at least in part on the type and purpose of the data stored in the computer data file and on the software used to create it. For example, computer data files for use with desktop publishing software application typically have components that correspond to predefined sections or data categories, such as text arranged in sentences, paragraphs, headings and blocks, drawings, tables, rows/columns, pages, drawing sheets, presentation slides, and spreadsheets, or function features, such as security features or authentication features. A software application developer or an end-user may define one or more sections of a computer data file that are composed of one or more constituent components of the computer data file. A section may encompass an entire computer data file or a portion of the computer data file, and may overlap another section in whole or in part.

Figures 14A, 14B:
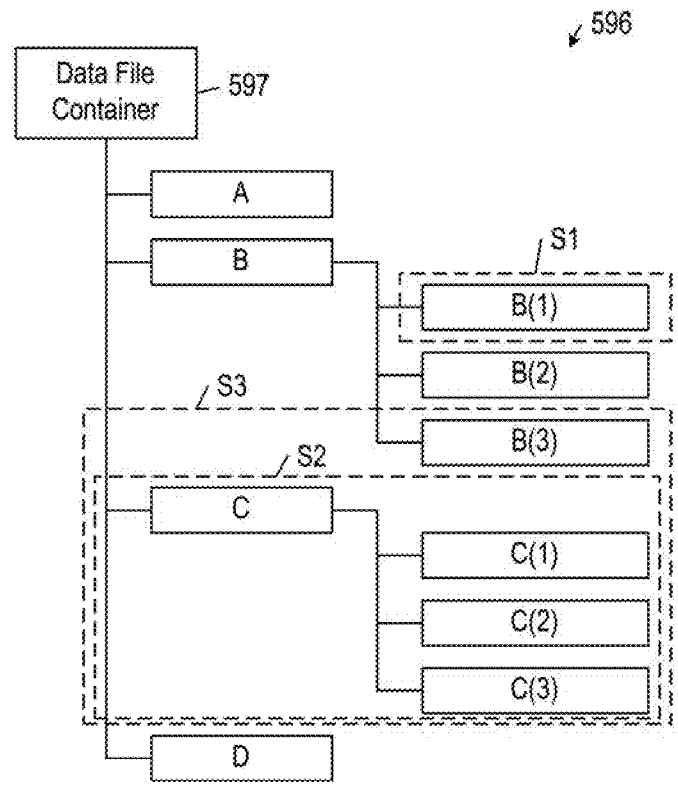
FIG. 14A is a block diagram of an embodiment of a computer data file.
FIG. 14B is a diagrammatic view of an embodiment of a computer data file section definition database storing records that define sections of the computer data file of FIG. 14A.

FIG. 14A shows an exemplary computer data file 596 that includes a data file container 597 that holds a hierarchical arrangement of components A, B, C, D, subcomponents B(1), B(2), and B(3) of component B, and subcomponents C(1), C(2), and C(3) of component C. The computer data file 596 is divided into three sections (S1, S2, S3), each of which is associated with one or more of the components and the subcomponents of the computer data file 596. For example, section S1 is associated with subcomponent B(1), section S2 is associated with component C, and section S3 is associated with subcomponent B(3) and component C.

The associations between components and sections of a computer data file may be stored in a variety of different data structure formats. For example, FIG. 14B shows an exemplary computer data file section definition database 598 that contains records that define the sections in the computer data file 596. The section definition records are indexed by a record identifier and an identifier of the computer data file 596. In some embodiments, the platform provides functions that allow a software application developer to design a software application with one or more dialog boxes that can be used by the end-user to create records in the computer data file section definition database 598.

A software application is a set of instructions that a computer can interpret and execute after the instructions have been loaded into a storage medium (e.g., hard drive, memory, or random access memory). A software application is composed of one or more logical components (e.g., hardwired, temporal, contextual, table lookup components) or functional components (e.g., functions or entry points) whose contents and structures depend at least in part on the functionality of the software application and architecture of its design. For example, some software applications use a componentized architecture that is made up of a number of components, each of which may be contained in a separate library and may expose a respective set of interfaces that enable it to be hosted by a main executable. A software application developer may define one or more sections of a software application that are composed of one or more components of the software application. A section may encompass an entire software application or a portion of the software application, and may overlap another section in whole or in part.

Figures 15A, 15B:
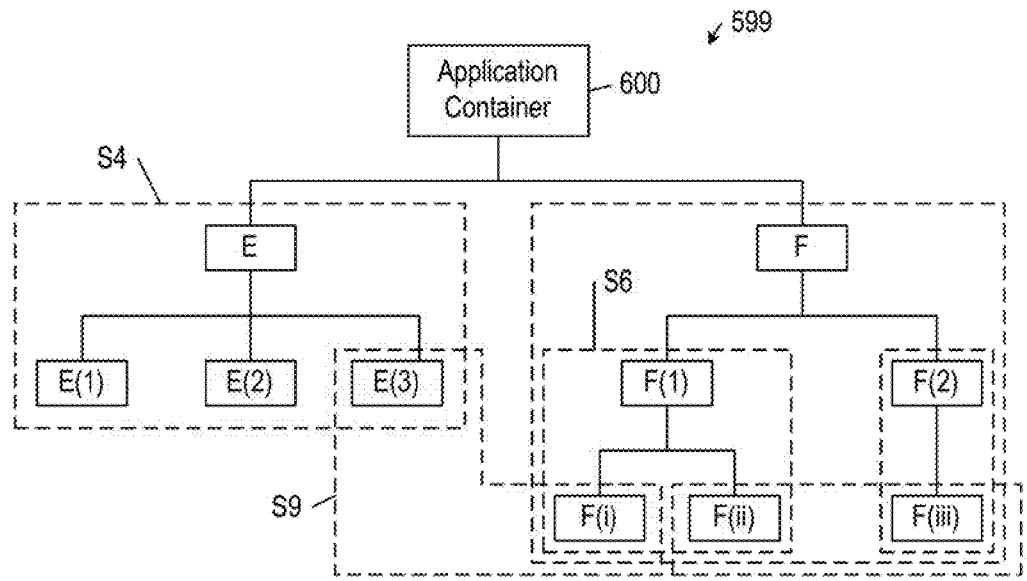
FIG. 15A is a block diagram of an embodiment of a software application file.
FIG. 15B is a diagrammatic view of an embodiment of a software application section definition database storing records that define sections of the software application of FIG. 15A.

FIG. 15A shows an exemplary software application 599 that includes an application container 600 that holds a hierarchical arrangement of components E, F, subcomponents E(1), E(2), and E(3) of component E, subcomponents F(1), F(2) of component F, subcomponents F(i) and F(ii) of subcomponent F(1), and a subcomponent F(iii) of subcomponent F(2). The software application 600 is divided into six sections (S4, S5, S6, S7, S8, S9) each of which is associated with one or more of the components and subcomponents of the software application 599. For example, section S4 is associated with subcomponent B(1), section S5 is associated with component F, section S6 is associated with subcomponent F(1), section S7 is associated with subcomponent F(2), section S8 is associated with subcomponents F(ii) and F(iii), and section S9 is associated with subcomponents E(3) and F(i).

The associations between components and sections of a software application may be stored in a variety of different data structure formats. For example, FIG. 15B shows an exemplary software application section definition database 602 that contains records that define the sections in the software application 599. The section definition records are indexed by a record identifier and an identifier of the software application 599. In some embodiments, the platform provides one or more dialog boxes that allow a software application developer to create database records in the software application section definition database 602.

Figure 16A:
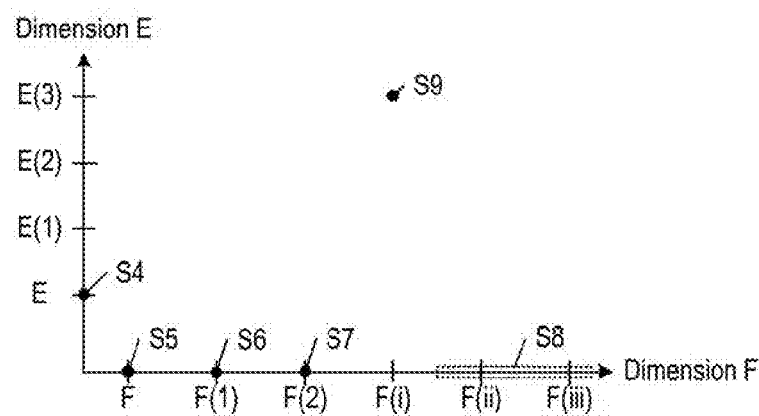
FIG. 16A is a diagrammatic view of an embodiment of an abstract virtual space that has zones which are mapped to sections of the software application of FIG. 15A.
Figure 16B:
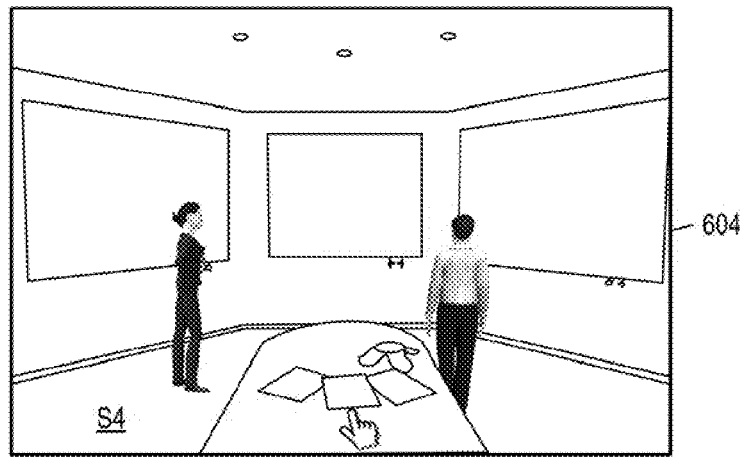
FIG. 16B is a diagrammatic view of embodiments of two visual virtual spaces that have zones which are mapped to sections of the software application of FIG. 15A.
Figure 16B:
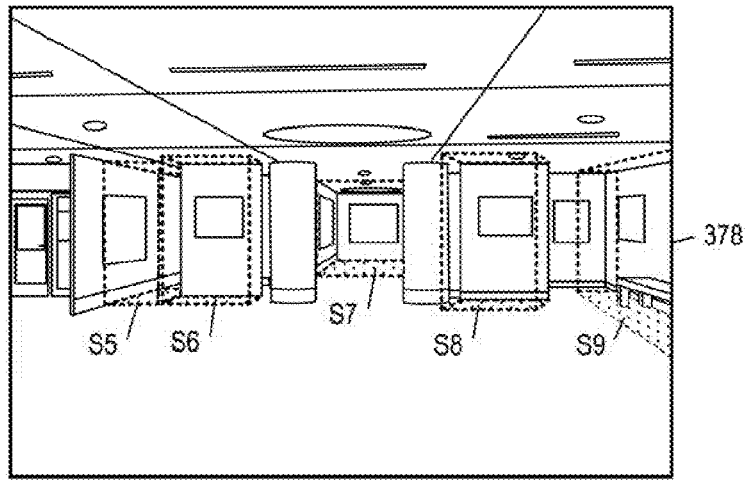

Referring to FIGS. 16A and 16B, in some embodiments, the one or more sections of a computer data file or a software application are associated with respective zones of a virtual area.

For example, in some embodiments, the one or more sections of a computer data file or a software application are associated with respective zones of an abstract virtual area that is defined with respect to coordinates in a one-dimensional or multi-dimensional abstract topological space that has a one-to-one mapping to positions in the associated computer data file or software application. For example, FIG. 16A shows an exemplary mapping of the sections S4-S9 of the software application 599 to respective coordinates in a two-dimensional topological space that has coordinates that map directly to respective ones of the components and subcomponents of the software application 599.

Figure 7B:
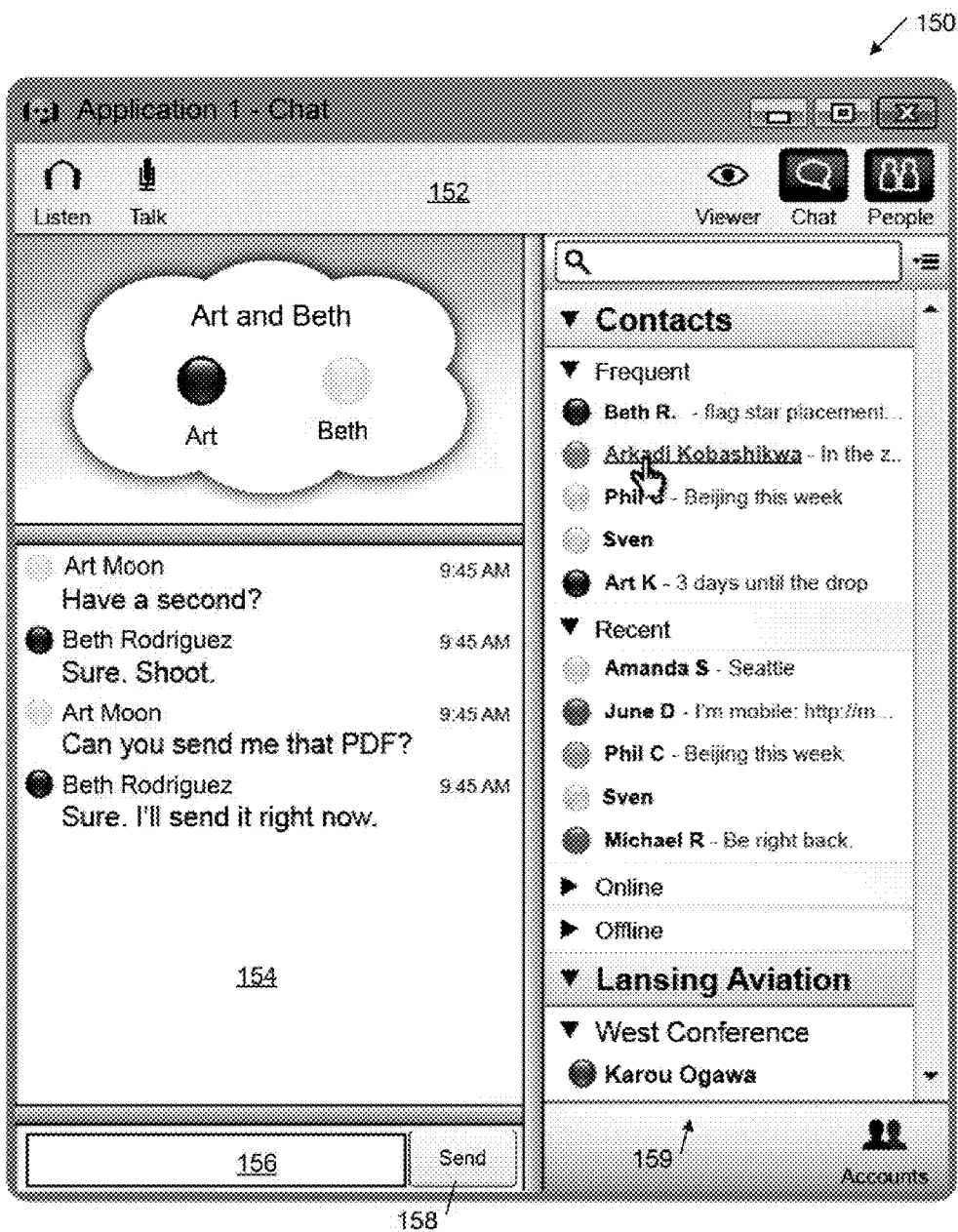
FIG. 7B is a diagrammatic view of an exemplary embodiment of a graphical user interface.
Figure 7C:
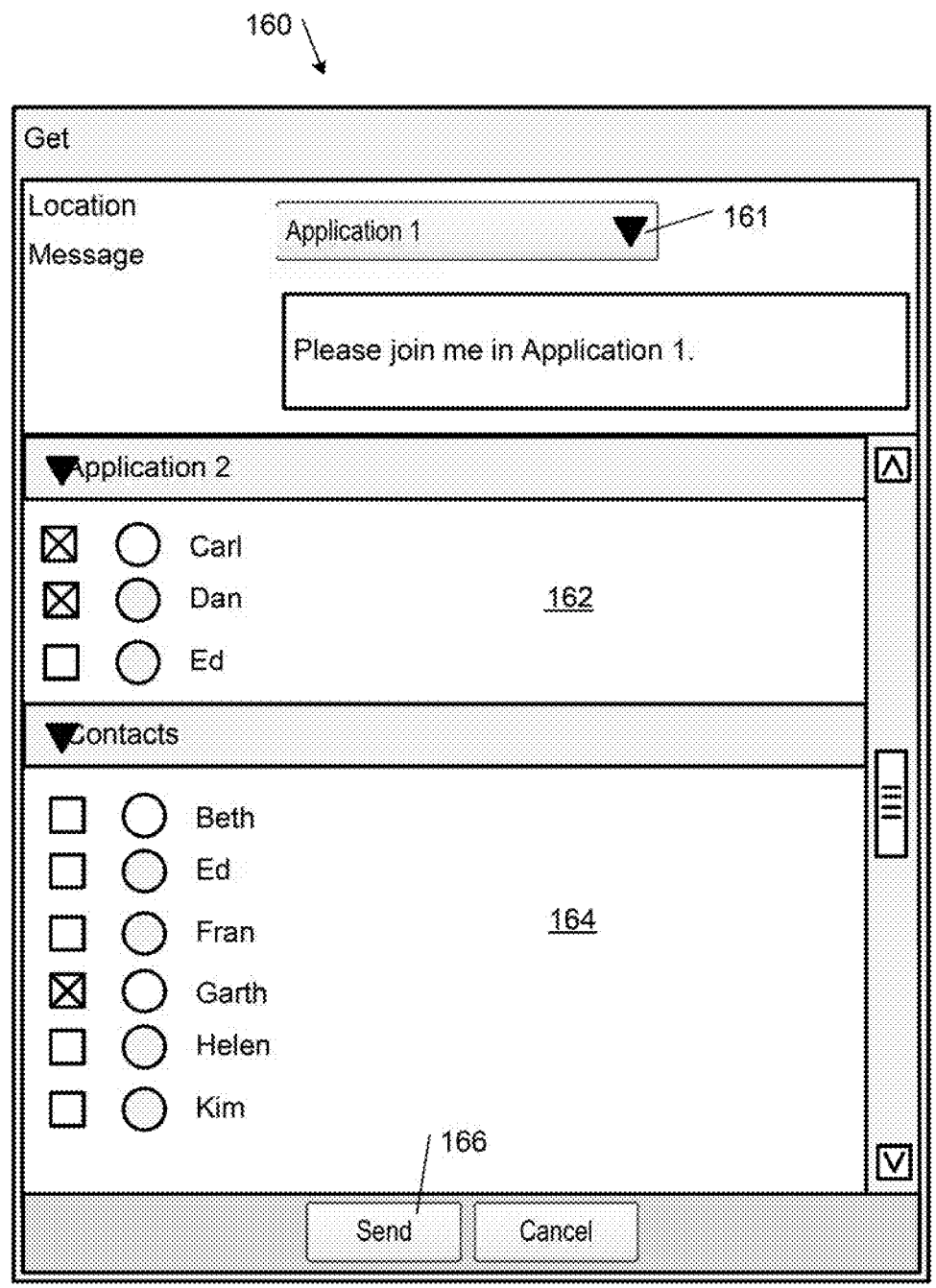
FIG. 7C is a diagrammatic view of an exemplary embodiment of a graphical user interface.

In other embodiments, the one or more sections of computer data file or a software application are associated with respective zones of one or more visual virtual areas, each of which may be defined with respect to one-, two- or three-dimensional geometric coordinates that are associated with a respective visualization. For example, FIG. 7B shows an exemplary mapping of the sections S4-S9 of the software application 599 to respective coordinates of two visual virtual areas 104 and 78. In this example, section S4 is associated with the visual virtual area 604, which is associated with a three-dimensional visualization of a conference room, and sections S5-S9 are associated with respective zones of the visual virtual area 378, which is associated with a three-dimensional visualization of an art gallery.

Additional details regarding systems and methods of defining the semantics of position in a software application or a computer data file are described in U.S. application Ser. No. 12/631,008, which was filed on Dec. 4, 2009.

Figure 17:
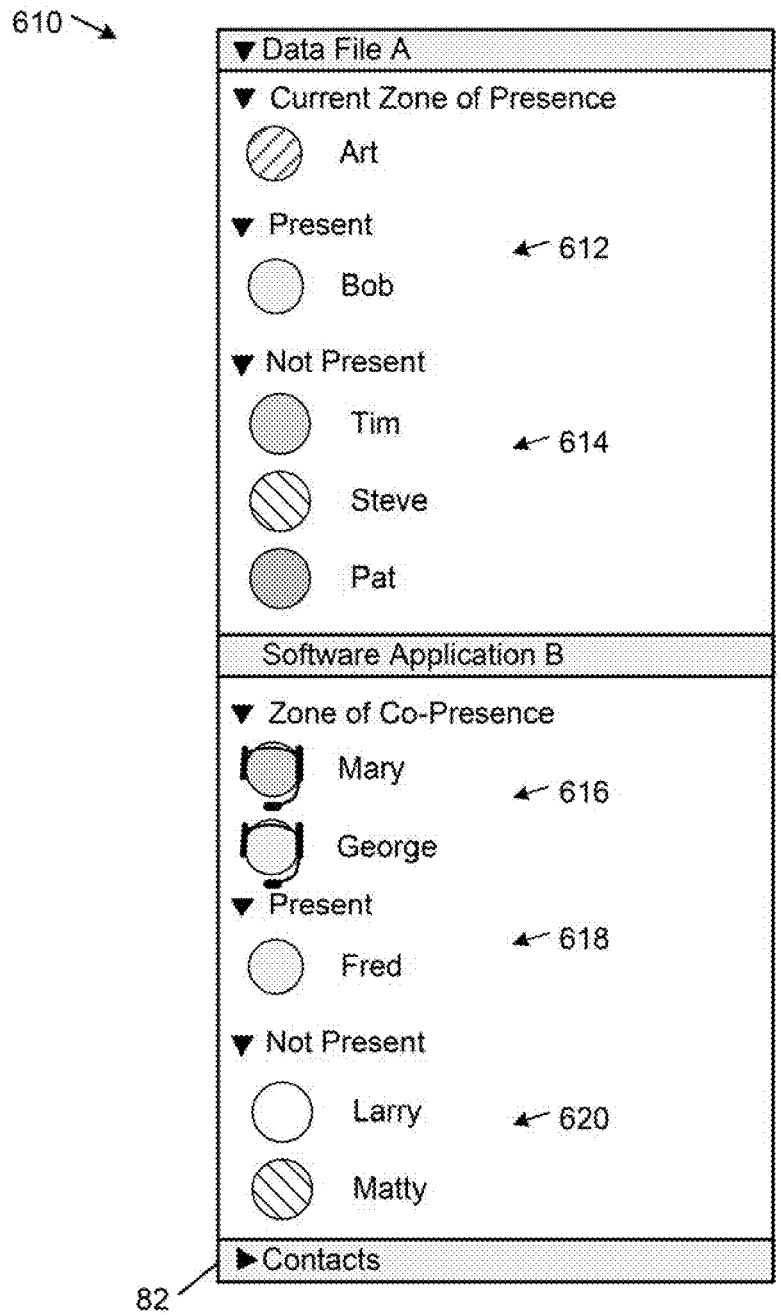
FIG. 17 is a diagrammatic view of an exemplary embodiment of a graphical user interface.

FIG. 17 shows an embodiment of a graphical user interface 610 that depicts the realtime availabilities and activities of some or all of the contacts of a target communicant ("Art" in this example) across different communication contexts defined by a data file A and a software application B. The software application B may be any type of software application, including consumer and business software applications (e.g., a personal information manager software application, such as the Microsoft® Outlook® software application; a document processing software application, such as the Microsoft® Word® software application; a spreadsheet software application, such as the Microsoft® Excel® software application, and a web browser software application, such as the Microsoft® Internet Explorer® software application). In this embodiment, for each data file and software application B of which Art is a member and with respect to which at least one of Art and Art's contacts is present, the members of the server application are segmented by the status of their presence with respect to the data file or software application. In this example, Art is member of Data File A and Software Application B. Thus, the members of Data File A are sorted into a Present group 612 and a Not Present group 614, and the members of Software Application B are sorted into a "Zone of Co-Presence" group 616, a Present group 618 and a Not Present group 620, where the zones correspond to respective sections of the Data File A and the Software Application B. In this way, Art readily can visualize who is present and which members are not present in each of the data files and software applications of which he is a member.

In some embodiments, each of the communications applications 26, 32 also includes a graphical navigation and interaction interface (referred to herein as a "seeker interface") that interfaces the user with the spatial virtual communication environment. The seeker interface includes navigation controls that enable the user to navigate the virtual environment and interaction controls that enable the user to control his or her interactions with other communicants in the virtual communication environment. The navigation and interaction controls typically are responsive to user selections that are made using any type of input device, including a computer mouse, a touch pad, a touch screen display, a keyboard, and a video game controller. The seeker interface is an application that operates on each client network node. The seeker interface is a small, lightweight interface that a user can keep up and running all the time on his or her desktop. The seeker interface allows the user to launch virtual area applications and provides the user with immediate access to realtime contacts and realtime collaborative places (or areas). The seeker interface is integrated with realtime communications applications and/or realtime communications components of the underlying operating system such that the seeker interface can initiate and receive realtime communications with other network nodes. A virtual area is integrated with the user's desktop through the seeker interface such that the user can upload files into the virtual environment created by the virtual environment creator 302, use files stored in association with the virtual area using the native client software applications independently of the virtual environment while still present in a virtual area, and more generally treat presence and position within a virtual area as an aspect of their operating environment analogous to other operating system functions rather than just one of several applications.

The spatial virtual communication environment typically can be modeled as a spatial hierarchy of places (also referred to herein as "locations") and objects. The spatial hierarchy includes an ordered sequence of levels ranging from a top level to a bottom level. Each of the places in a successive one of the levels of the spatial hierarchy is contained in a respective one of the places in a preceding one of the levels. Each of the objects in the spatial hierarchy is contained in a respective one of the places. The levels of the spatial hierarchy typically are associated with respective visualizations that are consistent with a geographical, architectural, or urban metaphor, and are labeled accordingly. The zones of each virtual area are defined by respective meshes, some of which define elements of a physical environment (e.g., spaces, such as rooms and courtyards, that are associated with a building) that may contain objects (e.g., avatars and props, such as view screen objects and conferencing objects).

The navigational controls of the seeker interface allow the user to traverse a path through the virtual environment in accordance with a navigational model that is tied to the underlying spatial hierarchy of places and objects. The network infrastructure service environment 306 records the path traversed by the user. In some embodiments, the network infrastructure service environment 306 records a history that includes a temporally ordered list of views of the virtual area that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view.

The interaction controls of the seeker interface allow the user to manage interactions with other communicants. The interaction options that available to the user typically depend on the zones in which the user has a presence. In some embodiments, the interaction options that are available to communicants who have presence in a particular zone are different from the options that are available to other communicants who do not have presence in that zone. The level of detail and interactivity of the user typically depend on whether or not the user has a presence the particular zone. In one exemplary embodiment, if the user is outside the virtual area, the user is provided with a minimal level of detail of the interactions occurring within the virtual area (e.g., the user can see an outline of the floorplan, background textures, and plants of the area, but the user cannot see where other communicants are present in the area); if the user is within the virtual area but outside a particular zone of the area, the user is provided with a medium level of detail of the interactions occurring within the particular zone (e.g., the user can see where other communicants are present in the area, see a visualization of their current states—talking, typing a chat message, whether or not their headphones and microphones are turned-on—and see whether any of the view screens are active); if the user is within the particular zone of the area, the user is provided with full level of detail of the interactions occurring with the particular zone (e.g., the user can see a thumbnail of the file being shared on a view screen, hear and speak with other communicants in the area, and see elements of a log of chat messages that were generated by communicants in the zone). In some embodiments, the switching and governance rules that are associated with the zones of the virtual area control how the network infrastructure services distinguish between those who have presence in the particular zone from those who do not.

FIG. 18 shows an embodiment of the seeker interface 400 that presents a top or floorplan view of the Acme virtual area in a Viewer Pane 402 and provides the user with a default set of interaction options. In the illustrated embodiment, a presence automatically is established in a courtyard zone 404 of the virtual area, and the user's microphone and default speakers (e.g., headphones) are turned-on. In the floorplan view shown in FIG. 14, the user is represented by a circular sprite 406; the other users in the Acme virtual area also are represented by respective circular sprites. The state of the user's speakers is depicted by the presence or absence of a headphones graphic on the user's sprite 406: when the speakers are on, the headphones graphic is present and, when the speakers are off, the headphones graphic is absent. The state of the user's microphone is depicted by the presence or absence of a microphone graphic on the user's sprite and a series of concentric circles around the user's sprite 406: when the microphone is on, the microphone graphic and the concentric circles are present and, when the microphone is off, the microphone graphic and the concentric circles are absent. The headphones graphic, the concentric circles, and the microphone graphic serve as visual reminders of the states of the user's sound playback and microphone devices.

The seeker interface includes a toolbar 408 that includes backward button 410, a forward button 412, a placemarks button 414, a home button 416, and a series of one or more breadcrumb links 418 that originate from and include the My Sites link 419. The breadcrumb links 418 correspond to a hierarchical sequence of successive, user-selectable links. Each of the successive links corresponds to a view of a respective level in the hierarchical model of the virtual area in which each successive level is contained by preceding ones of the levels. In the illustrated embodiment, the breadcrumb links 418 include a West Conference link 417 that corresponds to the current view of the West Conference virtual area shown in FIG. 14. The breadcrumb links 418 provide the user with single link selection access to respective views of different levels of the virtual environment. The toolbar 408 additionally includes a People Pane button 420, a Chat Pane button 421, a View Pane button 423, and a settings button 422.

A My Sites button 425 displays the list of areas that the user is a member of in the Viewer Pane 402. Clicking on a site in the My Sites view navigates the user to the target area and makes them present there.

When an area is selected or in focus, the People Pane button 420 appears as an iconographic representation of two people and is labeled "People," and allows members and moderators to see the list of people associated with the current area, their other areas of membership, and their contacts. In response to a user selection of the People Pane button 420, a list of all the members of the Acme virtual area, other areas of membership, and all the user's contacts are displayed in a People Pane 427. The user may select any of the communicants in the list and click a get button that is presented in the user interface; in response, the platform transmits an invitation to the selected communicant to join the user in a designated one of the zones.

The Chat Pane button displays and hides a Chat Pane 429 that includes a chat log associated with the current zone of presence.

The Viewer Pane button 423 displays and hides the Viewer Pane 402, which displays the Map or a view of any prop that can paint an image on the Viewer. Examples include view screens (for screen sharing) and Message Board objects.

The settings button 422 provides the user with access to a set of controls for specifying default settings that are associated with the current area.

The user may navigate from the view of the Acme virtual area shown in FIG. 14 back to a previous view by clicking the back button 410.

The user may navigate to any of the zones of the Acme virtual area. In some embodiments, in order to move to a zone, the user transmits a command to execute one of the zones displayed on the monitor, by clicking the label for the target zone, or, as a shortcut, double-clicking the zone) and, in response, the platform depicts the user's avatar in the zone corresponding to the zone object. In response to the zone execution command, the seeker interface updates the breadcrumb buttons 418 to show the current zone of presence in the hierarchy. Toolbar buttons specific to the zone of presence will also appear below the breadcrumb links 418.

The user also may interact with any objects (e.g., a screen, table, or file) that are present in a zone. In some embodiments, in order to interact with an object, the user clicks the object and, in response, the platform performs an operation with respect to the object (e.g., present a zoomed-in view of the object, open an interaction interface window, etc.). In response to the object execution command, the seeker interface outlines or otherwise highlights the prop (indicating to the user that it is selected) and updates the breadcrumb buttons 418 and toolbar to show the currently viewed object in the hierarchy.

Figure 19:
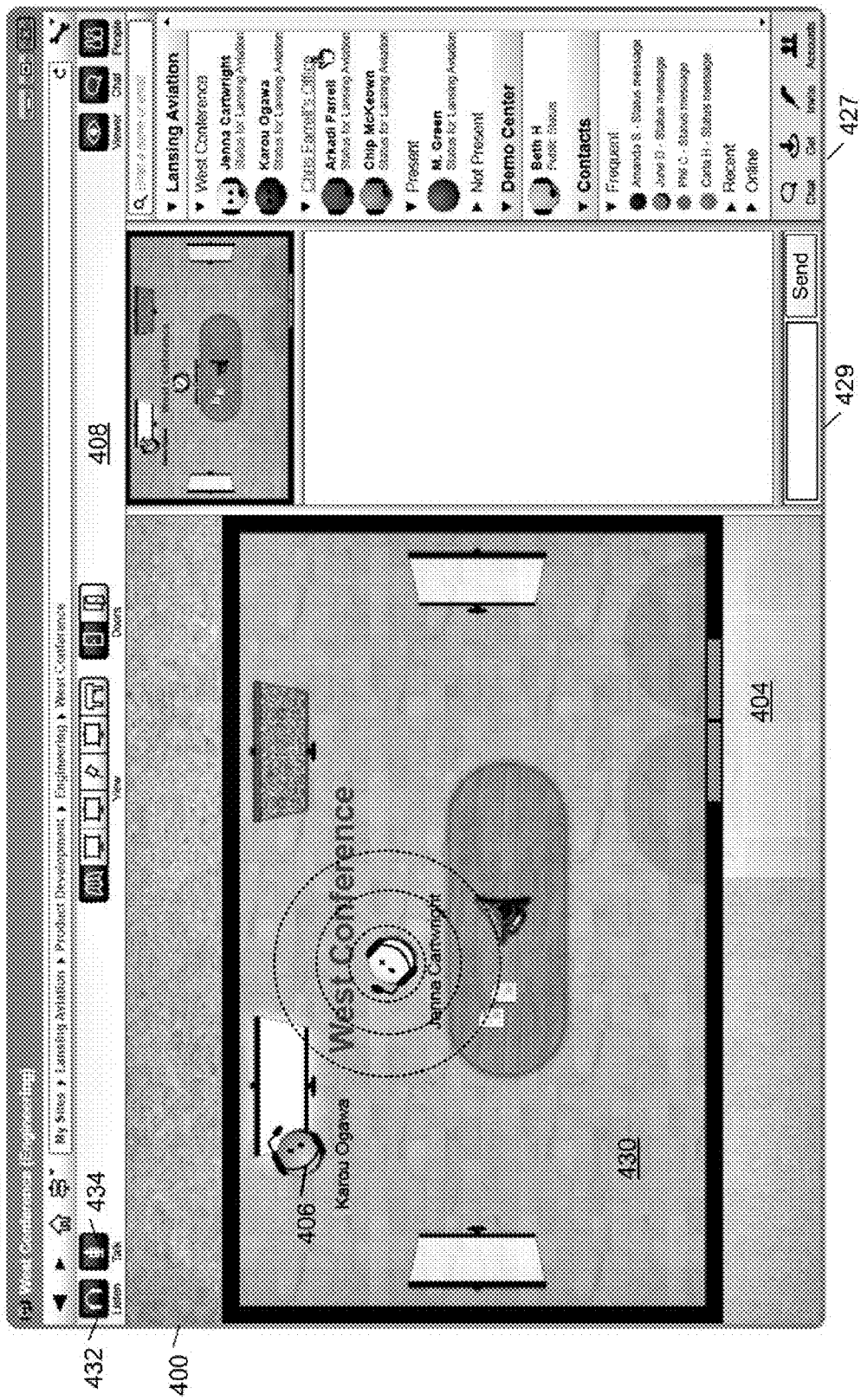
FIG. 19 is a diagrammatic view of an exemplary embodiment of a graphical user interface.

Referring to FIG. 19, in some embodiments, in response to the user entering the West Conference zone 430, the platform automatically establishes a network connection between the user and each of the other communicants occupying the selected zone. The user also may enter (and thereby establish a presence in) a zone by clicking the name of the zone on the map. This causes the platform to move the user's sprite from its current location (e.g., Courtyard) to the selected zone (e.g., West Conference). The states of the user's speakers and microphone may be set by the interaction controls 432, 434; the states typically do not change when the user is moved from one location to another. Additional details regarding the seeker interface 400 may be obtained from U.S. patent application Ser. No. 12/354,709, filed Jan. 15, 2009.

Figure 20:
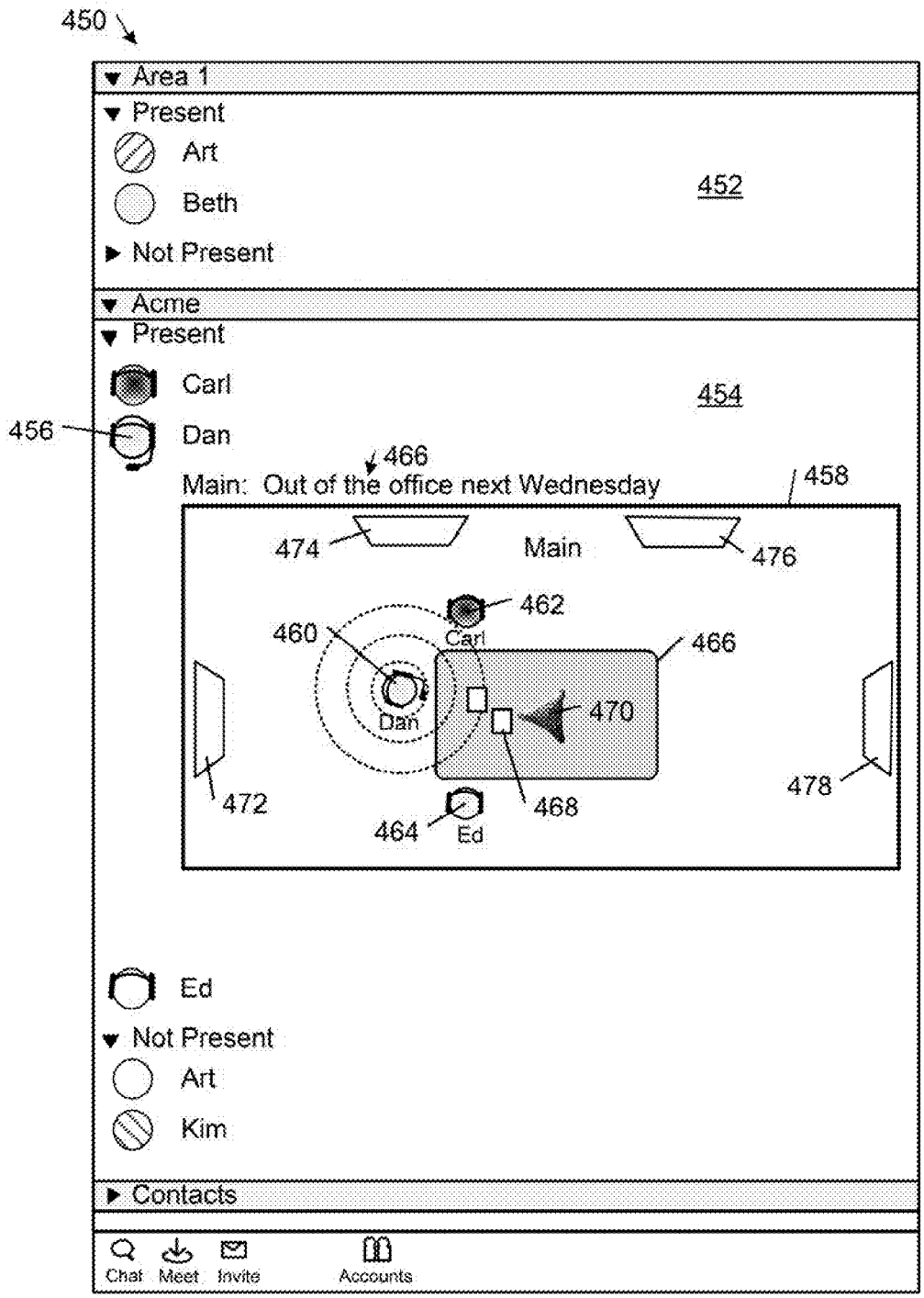
FIG. 20 is a diagrammatic view of an exemplary embodiment of a graphical user interface.

FIG. 20 shows an embodiment 450 of the graphical user interface 110 (see FIG. 5) in which the server application spaces 78, 80 correspond to virtual areas 452, 454. In this embodiment, the user may visualize the context of the interactions of any of the communicants that are present in an area by selecting the communicant's avatar. In the illustrated example, the user has selected Dan's avatar 456 and, in response, the platform has generated a two-dimensional minimap 458 of a zone (i.e., Main) of the virtual area (i.e., Acme) where Dan is speaking to two other communicants (i.e., Carl and Ed). The communicants that are present in the Main zone are represented by respective sprites 460, 462, 464. Each of the communicants has his respective speaker channel on as indicated by the presence of headphones on the sprites 460-464. Dan also has his microphone channel on as indicated by the presence of the microphone graphic on his sprite 460 and the presence of the concentric circles radiating from his sprite 460. As shown in the minimap 458, the Main zone includes a table object 466 supporting a file object 468 and a conferencing object 470, and four view screen objects 472, 474, 476, 478. The minimap 458 also is associated with a status message 466 from Dan (i.e., "Out of the office next Wednesday"). The user (Art in this example) may join the conversation taking place in the Main zone by clicking the label for the zone in the minimap (i.e., "Main") or by double-clicking on the image of the floor in the minimap 458, which instructs the platform to establish a presence for Art in the Main zone. Additional details regarding navigation and interaction with the Main zone, including the function and operation of the objects 466-470 are described in U.S. patent application Ser. No. 12/354,709, filed Jan. 15, 2009.

Figure 21:
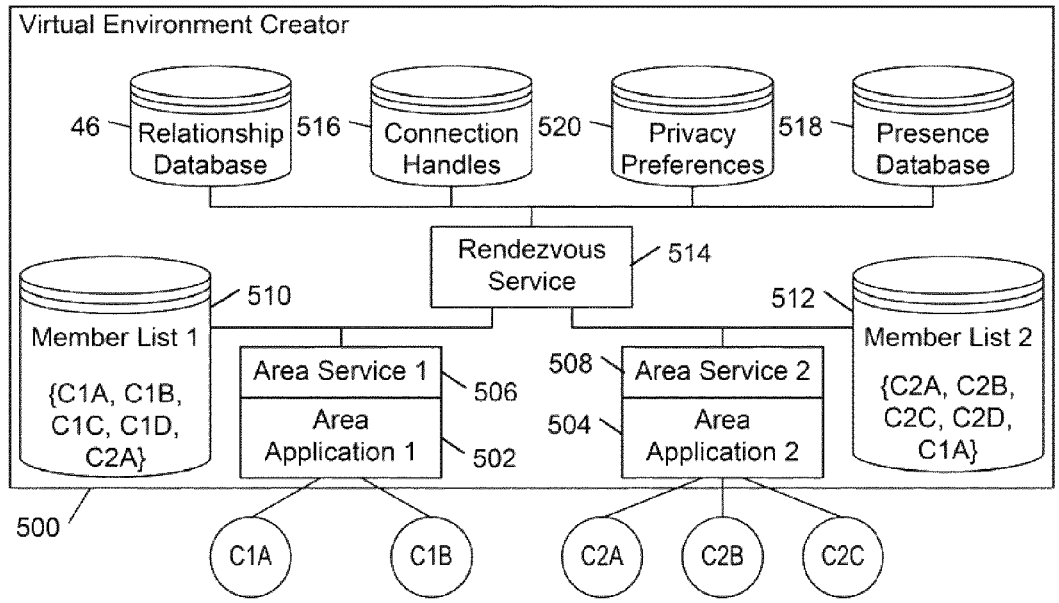
FIG. 21 is a diagrammatic view of an exemplary embodiment of the network communications environment shown in FIG. 1.

FIG. 21 shows an embodiment 500 of the virtual environment creator 302 that includes two different area-based server applications 502, 504 (Area Application 1 and Area Application 2). Each area application 502, 504 is associated with a respective member list 510, 512. The area-based server applications 502, 504 are administered by respective instances 506, 508 of the area service. The area service instances 506, 508 cooperate with the rendezvous service 514 to create different respective virtual areas for realtime communications between communicants. The rendezvous service 514 maintains the relationship database 46, the member lists 510, 512, and manages the collection, storage, and distribution of presence information and provides mechanisms for network nodes to communicate with one another (e.g., by managing the distribution of connection handles 516) subject to the capabilities of the requesting entities. The rendezvous service typically stores the presence information in a presence database 518. The rendezvous service typically manages communicant interactions with each other via communicant privacy preferences 520.

In the illustrated embodiment, communicants C1A, C1B, C1C, C1D, and C2A are members of Area Application 1, and communicants C2A, C2B, C2C, C2D, and C1A are members of Area Application 2. Communicants C1A and C1B currently are connected to Area Application 1 and communicants C2A, C2B, and C2C currently are connected to Area Application 2. In this example, all of the communicants C1B, C1C, C1D, C2A, C2B, C2C, and C2D are contacts of the communicant C1A.

Figure 22:
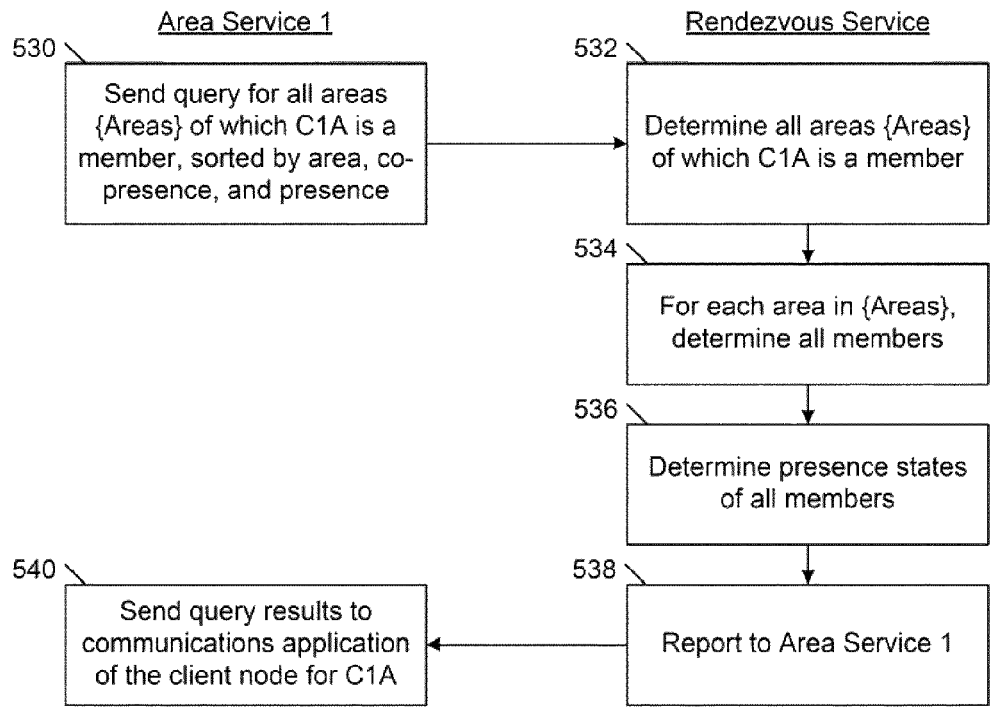
FIG. 22 is a flow diagram of an exemplary embodiment of a method of promoting communicant interactions in a network communications environment.

FIG. 22 shows an embodiment of a method that is implemented by the virtual environment creator 500 in a process of interfacing the communicant C1A to the network communication environment. In accordance with the method of FIG. 22, in response to the connection of the communicant C1A to the Area Application 1, the Area Service 1 sends to the rendezvous service 514 a query for all areas of which the communicant C1A is a member, sorted by area, co-presence, and presence (FIG. 22, block 530). In response to receipt of the query from the Area Service 1, the rendezvous service 514 determines all areas of which the communicant C1A is a member (FIG. 22, block 532). The rendezvous service 514 determines all the members of the determined areas based on the member lists (FIG. 22, block 534). The rendezvous service 514 typically obtains a list of all the members of the determined areas regardless of their connection status (i.e., online or offline). The rendezvous service 514 determines the presence states of all the determined members (FIG. 22, block 536). The rendezvous service 514 sends to the Area Service 1 the query results for all areas of which the communicant C1A is a member, sorted by area, co-presence, and presence (FIG. 22, block 538). The Area Service 1 sends the query results to the communications application running on the client node from which the communicant C1A is connecting to the Area Application 1 (FIG. 22, block 540).

Figure 23:
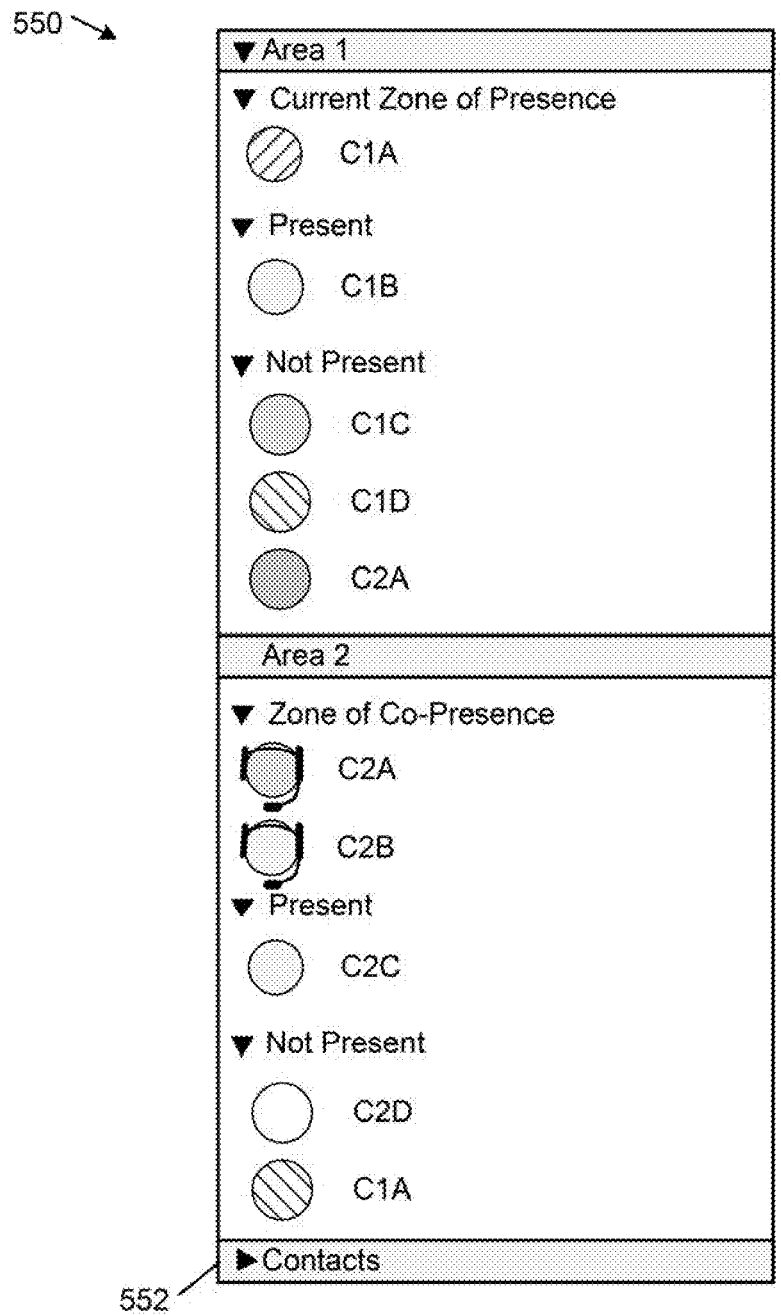
FIG. 23 is a diagrammatic view of an exemplary embodiment of a graphical user interface.

FIG. 23 shows an embodiment 550 of the graphical user interface 128 (see FIG. 6) that the generated by an embodiment of the communications application running on the client node from which the communicant C1A is connecting to the Area Application 1. In this example, the graphical user interface 550 depicts the realtime availabilities and activities of the contacts of the target communicant C1A across the different communication contexts defined by Area Application 1 and Area Application 2. In particular, with respect to the Area 1 defined by the Area Application 1, the graphical user interface 550 shows that the target communicant C1A is present in a Current Zone of Presence of Area 1, the communicant C1B is present in Area 1, and the communicants C1C, C1D, and C2A are not present in Area 1. With respect to the Area 2 defined by the Area Application 2, the graphical user interface 550 shows that the communicants C2A and C2B are present in a Zone of Co-Presence in Area 2, the communicant C2C is present in Area 2, and the communicants C2D and C1A are not present in Area 2.

In populating the Contacts section 552 of the graphical user interface 550, the rendezvous service typically obtains from the relationship database 46 a list of all the communicants with whom the target communicant has interacted. The relationship database 46 typically includes records of all the interactions (e.g., voice, chat, and screen share interactions) that the target communicant has had in any and all virtual areas of the virtual environment, along with their durations and places. In some embodiments, the Contacts section 552 contains all the communicants that the target communicant has interacted with at some level. In some embodiments, the contacts are grouped based on a relationship weight score that is assigned to the communicants. In some cases, the relationship weight score is determined from an analysis of the interactions that have occurred during a particular period (e.g., the past 15 days in 8-hour intervals). For each contact, the respective relationship weight score is incremented for every interval in which the contact has interacted with the target communicant, where higher relationship weight scores indicate the frequency of the contacts' interactions with the target communicant during the most recent period of time. The contacts can be grouped into multiple categories (e.g., "frequent," "regular," and "infrequent") based on the relationship weight scores.

III. CONCLUSION

The embodiments that are described herein provide improved systems and methods for promoting communicant interactions in a network communications environment. In particular, these embodiments provide a realtime visualization of a communicant's contacts' realtime availabilities and activities across different communication contexts. The information provided by this realtime visualization enables the communicant to make more informed network interaction decisions (e.g., when to interact with a contact) and encourages the communicant to initiate interactions with other communicants and to join contexts (e.g., an ongoing conversation between communicants) of which the communicant otherwise would not have been aware.

Other embodiments are within the scope of the claims.

The invention claimed is:

1. A method, comprising:
in a network communication environment in which communicants operating respective client network nodes connect to different server applications that are hosted by one or more server network nodes, wherein each server application supports realtime communications between co-present communicants in a respective virtual area comprising zones,
ascertaining ones of the communicants who are related to a target one of the communicants,
determining statuses of the ascertained communicants with respect to the different server applications,
generating a contact list comprising a linear sorted listing of the ascertained communicants, wherein the contact list groups the ascertained communicants into respective application groups according to their respective memberships in the virtual areas, and within each application group the contact list further groups ones of the ascertained communicants who are co-present in respective zones of the respective virtual area into respective zones of co-presence and prioritizes the listing of co-present ones of the communicants in the zones of co-presence ahead of non-co-present ones of the ascertained communicants who are present in respective ones of the zones of the respective virtual area in which fewer than two communicants are present,
to the client network node of the target communicant, transmitting the contact list, the determined statuses of the ascertained communicants, and indications of realtime activity states of respective ones of the ascertained communicants to display the contact list as a linear array of the application groups containing graphical representations of respective ones of the ascertained communicants in association with respective indications of the determined statuses and realtime activity states of the ascertained communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

2. The method of claim 1, wherein multiple of the different server applications respectively enable synchronous conferencing between respective ones of the communicants.

3. The method of claim 1, wherein the contact list comprises a respective visual demarcation of each application group and, within each application group, a respective visual demarcation of each zone of co-presence within the application group.

4. The method of claim 1, wherein the generating comprises for each server application with respect to which the target communicant is present, listing the target communicant's current zone of presence ahead of all other zones groups in the corresponding application group.

5. The method of claim 1, wherein the determining comprises, for each of the related communicants, determining each of the server applications of which the related communicant has a membership, and the transmitting comprises transmitting indications of the determined memberships of the related communicants.

6. The method of claim 1, wherein the ascertaining comprises identifying ones of the communicants with whom the target communicant has interacted in association with respective ones of the server applications as respective ones of the related communicants.

7. The method of claim 6, wherein the identifying comprises identifying ones of the communicants with whom the target communicant has communicated through realtime communication facilities provided in association with respective ones of the server applications as respective ones of the related communicants.

8. The method of claim 7, wherein the realtime communication facilities comprise at least one of an audio communications facility, a video communications facility, a realtime text chat communications facility, and a file sharing communications facility.

9. The method of claim 1, wherein the ascertaining comprises identifying ones of the communicants who the target communicant has claimed as a contact as respective ones of the related communicants.

10. The method of claim 1, wherein the transmitting comprises transmitting indications of ones of the related communicants who currently are connected to the network communication environment and respective indications of ones of the related communicants who currently are unconnected to the network communication environment.

11. The method of claim 1, wherein:
the determining comprises, for each of the related communicants, determining each of the server applications with which the related communicant has a presence; and
the transmitting comprises transmitting indications of which of the server applications the related communicants respectively have presence.

12. The method of claim 11,
further comprising, for each of the related communicants, determining each of zones of the server applications with which the related communicant has a presence; and
wherein the transmitting comprises transmitting indications of which of the zones of the server applications the related communicants respectively have presence.

13. The method of claim 1, wherein the generating comprises, within each application group, grouping respective ones of the communicants who are members of the respective server application and currently are not present in the respective server application into a separate group.

14. The method of claim 1, wherein the generating comprises, within each application group, sorting respective ones of the related communicants by frequency of interaction with the target communicant in the network communication environment.

15. The method of claim 1, wherein the generating comprises, within each application group, listing the respective zones of co-presence based on the respective numbers of communicants currently present in the corresponding zones.

16. The method of claim 1, wherein the generating comprises, with respect to each of the server applications in which the target communicant currently is present, sorting the listing of other zones in the corresponding application group in the contact list behind the zone of the server application in which the target communicant is present.

17. The method of claim 1, wherein the generating comprises sorting the related communicants in the contact list according to their respective connection statuses with respective ones of the server applications.

18. The method of claim 17, wherein the sorting comprises in the contact list grouping together ones of the related communicants who are unconnected to all of the server applications.

19. The method of claim 1, further comprising determining realtime communication activities of respective ones of the related communicants.

20. The method of claim 19, wherein the realtime communication activities comprise at least one of an audio communications activity, a video communications activity, a realtime text chat activity, and a file sharing activity.

21. The method of claim 1, further comprising determining communication channels available for communicating with respective ones of the related communicants in association with respective ones of the server applications, and wherein the transmitting comprises transmitting indications of the determined communication channels in association with the respective ones of the related communicants and the respective ones of the server applications.

22. The method of claim 21, wherein the determining comprises comparing realtime communication capabilities of respective ones of the related communicants and realtime communication facilities enabled by respective ones of the server applications.

23. The method of claim 21, wherein the realtime communication channels comprise at least one of an audio communications channel, a video communications channel, a realtime text chat channel, and a file sharing channel.

24. Apparatus operational in a network communication environment in which communicants operating respective client network nodes connect to different server applications that are hosted by one or more server network nodes, wherein each server application supports realtime communications between co-present communicants in a respective virtual area comprising zones, the apparatus comprising:
a computer-readable memory storing computer-readable instructions; and
a data processor coupled to the memory, operable to execute the instructions, and based at least in part on the execution of the instructions operable to perform operations comprising
ascertaining ones of the communicants who are related to a target one of the communicants,
determining statuses of the ascertained communicants with respect to the different server applications,
generating a contact list comprising a linear sorted listing of the ascertained communicants, wherein the contact list groups the ascertained communicants into respective application groups according to their respective memberships in the virtual areas, and within each application group the contact list further groups ones of the ascertained communicants who are co-present in respective zones of the respective virtual area into respective zones of co-presence and prioritizes the listing of co-present ones of the communicants in the zones of co-presence ahead of non-co-present ones of the ascertained communicants who are resent in respective ones of the zones of the respective virtual area in which fewer than two communicants are present,
to the client network node of the target communicant, transmitting the contact list, the determined statuses of the ascertained communicants, and indications of realtime activity states of respective ones of the ascertained communicants to display the contact list as a linear array of the application groups containing graphical representations of respective ones of the ascertained communicants in association with respective indications of the determined statuses and realtime activity states of the ascertained communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

25. At least one non-transitory computer-readable memory having computer-readable program code embodied therein, wherein when executed by a computer in a network communication environment in which communicants operating respective client network nodes connect to different server applications that are hosted by one or more server network nodes, wherein each server application supports realtime communications between co-present communicants in a respective virtual area comprising zones, the computer-readable program code causes the computer to perform operations comprising:
ascertaining ones of the communicants who are related to a target one of the communicants,
determining statuses of the ascertained communicants with respect to the different server applications,
generating a contact list comprising a linear sorted listing of the ascertained communicants, wherein the contact list groups the ascertained communicants into respective application groups according to their respective memberships in the virtual areas, and within each application group the contact list further groups ones of the ascertained communicants who are co-present in respective zones of the respective virtual area into respective zones of co-presence and prioritizes the listing of co-present ones of the communicants in the zones of co-presence ahead of non-co-present ones of the ascertained communicants who are present in respective ones of the zones of the respective virtual area in which fewer than two communicants are present,
to the client network node of the target communicant, transmitting the contact list, the determined statuses of the ascertained communicants, and indications of realtime activity states of respective ones of the ascertained communicants to display the contact list as a linear array of the application groups containing graphical representations of respective ones of the ascertained communicants in association with respective indications of the determined statuses and realtime activity states of the ascertained communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

26. A method, comprising:

in a network communication environment in which communicants operating respective client network nodes connect to different server applications that are hosted by one or more server network nodes, wherein each server application supports realtime communications between co-present communicants in a respective virtual area comprising zones, by a given one of the client network nodes from which a given one of the communicants is operating, connecting to a target one of the server applications, receiving indications of ones of the communicants who are related to the given communicant and statuses of the related communicants with respect to associations with the different server applications, wherein the receiving comprises receiving a contact list comprising a linear sorted listing of the related communicants, wherein the contact list groups the related communicants into respective application groups according to their respective memberships in the virtual areas, and within each application group the contact list further groups ones of the related communicants who are co-present in respective zones of the respective virtual area into respective zones of co-presence and prioritizes the listing of co-present ones of the communicants in the zones of co-presence ahead of non-co-present ones of the ascertained communicants who are present in respective ones of the zones of the respective virtual area in which fewer than two communicants are present, and on a display displaying graphical representations of the related communicants, graphical indications of the statuses of the related communicants with respect to connections to the different server applications, and indications of realtime activity states of respective ones of the related communicants, wherein the displaying comprises displaying the contact list as a linear array of the application groups containing graphical representations of the related communicants associated with respective indications of the determined statuses and realtime activity states of the related communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

27. The method of claim 26, wherein
the displaying comprises displaying a respective visual demarcation of each application group and, within each application group, a respective visual demarcation of each zone of co-presence within the application group.

28. The method of claim 26, wherein the displaying comprises, for each virtual area in which the given communicant is present, displaying the given communicant's current zone of presence ahead of all other zones in the corresponding application group.

29. The method of claim 26, wherein the displaying comprises, within each application group, displaying the graphical representations of the respective ones of the related communicants sorted by status of connection to the respective server applications.

30. The method of claim 26, wherein the displaying comprises, within each application group, displaying the graphical representations of the respective ones of the related communicants sorted by frequency of interaction with the given communicant in the network communication environment.

31. The method of claim 26, wherein the displaying comprises within each application group displaying the respective zones of co-presence sorted based on the respective numbers of communicants currently present in the corresponding zones.

32. The method of claim 26, wherein the displaying comprises displaying the zone of presence of the given communicant at the top of the contact list.

33. The method of claim 26, wherein the displaying comprises displaying the graphical representations of the related communicants grouped according to their respective connection statuses with respective ones of the server applications.

34. The method of claim 33, wherein the displaying comprises displaying grouped together the graphical representations of ones of the related communicants who are unconnected to all of the server applications.

35. The method of claim 26, wherein the realtime communication activities comprise at least one of an audio communications activity, a video communications activity, a realtime text chat activity, and a file sharing activity.

36. The method of claim 26, wherein:
the received indications comprise indications of communication channels available for communicating with respective ones of the related communicants in association with respective ones of the server applications; and
the displaying comprises displaying graphical indications of the communication channels in association with the graphical representations of the respective ones of the related communicants.

37. The method of claim 36, wherein the realtime communication channels comprise at least one of an audio communications channel, a video communications channel, a realtime text chat channel, and a file sharing channel.

38. The method of claim 26, wherein:
the received indications comprise indications of ones of the related communicants who are connected to the network communication environment and indications of ones of the related communicants who are unconnected to the network communication environment; and
the displaying comprises displaying an online connection status indicator in association with the graphical representations of ones of the related communicants who are connected to the network communication environment, and displaying an offline connection status indicator in association with the graphical representations of ones of the related communicants who are unconnected to the network communication environment.

39. Apparatus operational in a network communication environment in which communicants operating respective client network nodes connect to different server applications that are hosted by one or more server network nodes, wherein each server application supports realtime communications between co-present communicants in a respective virtual area comprising zones, the apparatus comprising:
a computer-readable memory storing computer-readable instructions; and a data processor coupled to the memory, operable to execute the instructions, and based at least in part on the execution of the instructions operable to perform operations comprising connecting to a target one of the server applications,
receiving indications of ones of the communicants who are related to the given communicant and statuses of the related communicants with respect to associations with the different server applications, wherein the receiving comprises receiving a contact list comprising a linear sorted listing of the related communicants, wherein the contact list groups the related communicants into respective application groups according to their respective memberships in the virtual areas, and within each application group the contact list further groups ones of the related communicants who are co-present in respective zones of the respective virtual area into respective zones of co-presence and prioritizes the listing of co-present ones of the communicants in the zones of co-presence ahead of non-co-present ones of the ascertained communicants who are present in respective ones of the zones of the respective virtual area in which fewer than two communicants are present, and on a display displaying graphical representations of the related communicants, graphical indications of the statuses of the related communicants with respect to connections to the different server applications, and indications of realtime activity states of respective ones of the related communicants, wherein the displaying comprises displaying the contact list as a linear array of the application groups containing graphical representations of the related communicants associated with respective indications of the determined statuses and realtime activity states of the related communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

40. At least one non-transitory computer-readable memory having computer-readable program code embodied therein, wherein when executed by a computer in a network communication environment in which communicants operating respective client network nodes connect to different server applications that are hosted by one or more server network nodes, wherein each server application supports realtime communications between co-present communicants in a respective virtual area comprising respective zones, the computer-readable program code causes the computer perform operations comprising:

connecting to a target one of the server applications,
receiving indications of ones of the communicants who are related to the given communicant and statuses of the related communicants with respect to associations with the different server applications, wherein the receiving comprises receiving a contact list comprising a linear sorted listing of the related communicants, wherein the contact list groups the related communicants into respective application groups according to their respective memberships in the virtual areas, and within each application group the contact list further groups ones of the related communicants who are co-present in respective zones of the respective virtual area into respective zones of co-presence and prioritizes the listing of co-present ones of the communicants in the zones of co-presence ahead of non-co-present ones of the ascertained communicants who are present in respective ones of the zones of the respective virtual area in which fewer than two communicants are present, and on a display displaying graphical representations of the related communicants, graphical indications of the statuses of the related communicants with respect to connections to the different server applications, and indications of realtime activity states of respective ones of the related communicants, wherein the displaying comprises displaying the contact list as a linear array of the application groups containing graphical representations of the related communicants associated with respective indications of the determined statuses and realtime activity states of the related communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

41. A method, comprising:
in a network communication environment in which communicants operating respective client network nodes connect to a virtual area that has multiple zones with respect to each of which respective ones of the communicants are able to be associated, ascertaining ones of the communicants who are related to a target one of the communicants,
identifying each of one or more zones of co-presence corresponding to the zones in which at least one of the related communicants is co-present with at least one other communicant,
generating a contact list comprising a linear listing of the related communicants sorted into respective groups according to the related communicants' respective presences in the corresponding zones of the virtual area, wherein the generating comprises prioritizing the listing of communicants in groups corresponding to the identified zones of co-presence ahead of communicants who are not co-present with at least one other communicant in a respective one of the zones of the virtual area, and
to the client network node of the target communicant, transmitting the contact list, statuses of the related communicants, and indications of realtime activity states of respective ones of the related communicants to display the contact list as a linear array of graphical representations of the related communicants in association with respective indications of the determined statuses and realtime activity states of the related communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

42. The method of claim 41, wherein the virtual area is a visual area associated with a spatial visualization and the zones correspond to respective sections of the spatial visualization.

43. The method of claim 41, wherein the virtual area represents a software application and the zones correspond to respective sections of the software application.

44. The method of claim 41, wherein the virtual area represents a computer data file and the zones correspond to respective sections of the computer data file.

45. A method, comprising:

in a network communication environment in which communicants operating respective client network nodes connect to a server application that is hosted by one or more server network nodes and supports realtime communications between co-present communicants, ascertaining ones of the communicants who are members of the server application, determining presence statuses of the ascertained communicants with respect to the target server application, based on the determined presence statuses, identifying each group of two or more of the ascertained communicants who are co-present with one another in the target server application and identifying non-co-present ones of the ascertained communicants who are not co-present with at least one other one of the ascertained communicants in the target server application, generating a contact list comprising a linear sorted listing of the ascertained communicants, wherein the contact list lists each identified group of co-present communicants in a separate zone of co-presence lists the identified non-co-present communicants outside the zones of co-presence, and prioritizes the listing of each zone of co-presence ahead of the listing of the ones of the ascertained communicants in the target server application who are not co-present with at least one other communicant in the target server application, to the client network node of the target communicant, transmitting the contact list, the determined statuses of the ascertained communicants, and indications of realtime activity states of respective ones of the ascertained communicants to display in the contact list graphical representations of the ascertained communicants in association with respective indications of the determined statuses and realtime activity states of the ascertained communicants, wherein the graphical representations of the co-present ones of the ascertained communicants are grouped together in the respective zones of co-presence to show that ongoing communications between the co-present communicants are occurring, and the graphical representations of the non-co-present ones of the ascertained communicants are shown segregated from the zones of co-presence.

46. The method of claim 45, wherein the contact list comprises a respective graphical zone boundary visually demarcating each zone of co-presence.

47. The method of claim 45, wherein the generating comprises listing the ascertained communicants in the contact list in respective groupings based on the respective numbers of communicants currently present in the corresponding zones.

48. The method of claim 45, wherein the generating comprises listing the target communicant's current zone of co-presence ahead of all other zones of co-presence in the contact list.

49. The method of claim 45, wherein the generating comprises listing the graphical representation of the target communicant at the top of the contact list.

* * * * *